United States Patent
Ma et al.

(10) Patent No.: US 11,290,930 B2
(45) Date of Patent: Mar. 29, 2022

(54) RESOURCE HANDOVER CONFIGURATION METHOD, DEVICE AND EQUIPMENT

(71) Applicant: VIVO MOBILE COMMUNICATION CO., LTD., Guangdong (CN)

(72) Inventors: Yue Ma, Chang'an Dongguan (CN); Yumin Wu, Chang'an Dongguan (CN); Li Chen, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 43 days.

(21) Appl. No.: 16/646,547

(22) PCT Filed: Sep. 18, 2018

(86) PCT No.: PCT/CN2018/106280
§ 371 (c)(1),
(2) Date: Mar. 11, 2020

(87) PCT Pub. No.: WO2019/062605
PCT Pub. Date: Apr. 4, 2019

(65) Prior Publication Data
US 2020/0275326 A1    Aug. 27, 2020

(30) Foreign Application Priority Data

Sep. 28, 2017   (CN) .......................... 201710950735.4

(51) Int. Cl.
*H04L 1/18*        (2006.01)
*H04W 36/00*    (2009.01)
(Continued)

(52) U.S. Cl.
CPC ......... *H04W 36/0072* (2013.01); *H04W 8/24* (2013.01); *H04W 72/042* (2013.01);
(Continued)

(58) Field of Classification Search
None
See application file for complete search history.

(56) References Cited

U.S. PATENT DOCUMENTS

2007/0197256 A1   8/2007   Wu et al.
2012/0195298 A1 * 8/2012   Kuo ...................... H04W 74/02
                                                                370/338
(Continued)

FOREIGN PATENT DOCUMENTS

CN    101069436 A    11/2007
CN    103379468 A    10/2013
(Continued)

OTHER PUBLICATIONS

"3rd Generation Partnership Project; Technical Specification Group Services and System Aspects; Study on Architecture for Next Generation System (Release 14)" 3GPP TR 23.799 V14.0.0 (Dec. 2016).
(Continued)

*Primary Examiner* — Sithu Ko
(74) *Attorney, Agent, or Firm* — Maschoff Brennan

(57) ABSTRACT

Disclosed in the embodiments of the present application are a resource handover configuration method, a device, a network device, a user equipment, and a computer readable medium, wherein the method includes: receiving single transmission/reception capability information from a terminal device; configuring a discontinuous transmission/reception pattern for the terminal device and a plurality of network service nodes corresponding to the terminal device according to the single transmission/reception capability information; and performing single-transmission/reception-mode-based information transmission between the network service node and the terminal device according to the discontinuous transmission/reception pattern.

18 Claims, 8 Drawing Sheets

(51) Int. Cl.

| | |
|---|---|
| H04W 76/15 | (2018.01) |
| H04W 76/28 | (2018.01) |
| H04W 76/30 | (2018.01) |
| H04W 76/11 | (2018.01) |
| H04W 8/24 | (2009.01) |
| H04W 72/04 | (2009.01) |

(52) U.S. Cl.
CPC ............ *H04W 76/11* (2018.02); *H04W 76/15* (2018.02); *H04W 76/28* (2018.02); *H04W 76/30* (2018.02)

(56) References Cited

U.S. PATENT DOCUMENTS

| | | | |
|---|---|---|---|
| 2015/0098452 | A1 | 4/2015 | Dalsgaard et al. |
| 2015/0195867 | A1* | 7/2015 | Koc ...................... H04W 76/15 370/311 |
| 2015/0327280 | A1* | 11/2015 | Zhang .................. H04W 76/20 370/280 |
| 2016/0014691 | A1* | 1/2016 | Rastogi ................ H04W 76/28 370/311 |
| 2016/0044743 | A1* | 2/2016 | Xu ........................ H04W 76/34 370/329 |
| 2016/0143032 | A1 | 5/2016 | Horiuchi |
| 2016/0192433 | A1 | 6/2016 | Deenoo et al. |
| 2016/0218853 | A1 | 7/2016 | Takeda et al. |
| 2016/0270139 | A1* | 9/2016 | Rahman ............ H04W 72/0406 |
| 2018/0049213 | A1* | 2/2018 | Gholmieh ......... H04W 72/1215 |
| 2018/0110088 | A1* | 4/2018 | Zhu ....................... H04W 76/15 |
| 2018/0227960 | A1* | 8/2018 | Belghoul .............. H04L 1/1812 |
| 2019/0387569 | A1* | 12/2019 | Martinez Tarradell ...................... H04W 76/15 |

FOREIGN PATENT DOCUMENTS

| | | |
|---|---|---|
| CN | 103379622 A | 10/2013 |
| CN | 104518858 A | 4/2015 |
| CN | 105340346 A | 2/2016 |
| WO | 2016/095078 A1 | 6/2016 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)" 3GPP TS 36.321 V14.4.0 (Sep. 2017).
"3rd Generation Partnership Project; Technical Specification Group Radio Access Network; Study on Small Cell enhancements for E-UTRA and E-UTRAN; Higher layer aspects (Release 12)" 3GPP TR 36.842 V12.0.0 (Dec. 2013).
"3rd Generation Partnership Project; Technical Specification Group Radio Access Network; Study on New Radio Access Technology; Radio Interface Protocol Aspects (Release 14)" 3GPP TR 38.804 V14.0.0 (Mar. 2017).
"3rd Generation Partnership Project; Technical Specification Group Radio Access Network; Study on New Radio (NR) access technology (Release 14)" 3GPP TR 38.912 V.14.1.0 (Jun. 2017).
"3rd Generation Partnership Project; Technical Specification Group Radio Access Network; Evolved Universal Terrestrial Radio Access (E-UTRA); Radio Resource Control (RRC); Protocol specification (Release 14)" 3GPP TS 36.331 V14.4.0 (Sep. 2017).
EP Search Report in Application No. 18860920.0 dated Oct. 19, 2020.
CN Office Action in Application No. 201710950735.4 dated Oct. 14, 2020.
"Offline discussions and proposals on harmonic interference handling" 3GPP TSG-RAN WG1 NR_AH #3, Sep. 18, 2017.
"Discussion on UP common issues" 3GPP TSG-RAN2 Meeting #83bis, Oct. 7, 2013.
"TP on small cells dual and single radio alternatives" 3GPP TSG-RAN WG2 Meeting #83bis, Oct. 7, 2013.
"LTE/NR UE capability dependency and coordination" 3GPP TSG-RAN WG2 Meeting #99, Aug. 21, 2017.
"DC based NR scheme for 0ms interruption handover" 3GPP TSG-RAN WG2#99, Aug. 21, 2017.
"LS on Single UL transmission" 3GPP TSG RAN WG4 Meeting #84, Aug. 21, 2017.
"Single Tx switched UL" 3GPP RAN #77, Sep. 11, 2017.
"Signalling for Single/Dual UL Tx (current status)" RAN2 Chairman (Intel), 3GPP Sep. 2017 RP-172082—RAN2 Status Report to Ran#77.
Intel Corporation, "Challenges in the uplink to support dual connectivity" 3GPP TSG RAN WG2 Meeting #83 R2-132860, Aug. 23, 2013. Section 2.
"Challenges in the uplink to support dual connectivity" 3GPP TSG RAN WG2 Meeting #83, Aug. 19, 2013.
Written Opinion and International Search Report in Application No. PCT/CN2018/106280 dated Apr. 9, 2020.

\* cited by examiner

| Entry number corresponding to parameter | UL Band Channel ID | UL Band Channel ID | DL Band Channel ID |
|---|---|---|---|
| 1 | X-1 | Y-2 | Y-3 |
| 2 | X-2 | Y-2 | W-1 |
| 3 | Y-1 | Z-3 | Y-3, W-2 |
| 4 | Y-2 | W-3 | W-2, P-1 |
| ... | ... | ... | ... |

FIG. 10

| Entry number corresponding to parameter | UL Band Channel ID | UL transmission power | UL Band Channel ID | UL transmission power | DL Band Channel ID |
|---|---|---|---|---|---|
| 1 | X-1 | xx | Y-2 | xx | Y-3 |
| 2 | X-2 | xx | Y-2 | xx | W-1 |
| 3 | Y-1 | xx | Z-3 | xx | Y-3, W-2 |
| 4 | Y-2 | xx | W-3 | xx | W-2, P-1 |
| ... | ... | ... | ... | ... | ... |

FIG. 11

RESOURCE HANDOVER CONFIGURATION METHOD, DEVICE AND EQUIPMENT

CROSS-REFERENCE TO RELATED APPLICATION

The present application is the U.S. national phase of PCT Application No. PCT/CN2018/106280 filed on Sep. 18, 2018, which claims a priority of the Chinese patent application No. 201710950735.4 filed in China on Sep. 28, 2017, disclosures of which are incorporated herein by reference in their entireties.

TECHNICAL FIELD

This application relates to communication technologies, and in particular, to a resource handover configuration method, a resource handover configuration device, a network device, a User Equipment (UE), and a computer readable storage medium.

BACKGROUND

In communication systems such as fifth Generation (5G)/Long Term Evolution (LTE) system, a terminal device is allowed to exchange information with a network side simultaneously based on multiple air interface standards. Due to limitations of factors such as signal interference and capabilities of the terminal device, the terminal device usually cannot transmit signals at multiple different frequencies simultaneously, which makes the terminal device usually transmit the signals at only one frequency within a certain time range.

A technical problem worthy of attention is how to perform corresponding resource handover configuration at the network side, so as to enable the terminal device to operate appropriately and simultaneously based on two air interface standards.

SUMMARY

The embodiments of the present application provide a technical solution for resource handover configuration.

According to an aspect of the embodiments of the present application, a resource handover configuration method is provided, which mainly includes: receiving single transmission/reception capability information from a terminal device; configuring a discontinuous transmission/reception pattern for the terminal device and a plurality of network service nodes corresponding to the terminal device according to the single transmission/reception capability information; and performing single-transmission/reception-mode-based information transmission between the network service node and the terminal device according to the discontinuous transmission/reception pattern.

According to another aspect of the embodiments of the present application, a resource handover configuration method is provided, which mainly includes: reporting, via a terminal device, single transmission/reception capability information to at least one network service node connected to the terminal device, wherein the single transmission/reception capability information is used for configuring a discontinuous transmission/reception pattern for the terminal device and the at least one network service node corresponding to the terminal device, and the discontinuous transmission/reception pattern is used for performing single-transmission/reception-mode-based information transmission between the network service node and the terminal device.

According to yet another aspect of the embodiments of the present application, a resource handover configuration device is provided, which includes: a receiving unit, used for receiving single transmission/reception capability information from a terminal device; a configuration unit, used for configuring a discontinuous transmission/reception pattern for the terminal device and a plurality of network service nodes corresponding to the terminal device according to the single transmission/reception capability information; and a communication unit, used for performing single-transmission/reception-mode-based information transmission between the network service node and the terminal device according to the discontinuous transmission/reception pattern.

According to still yet another aspect of the embodiments of the present application, a network device is provided, which mainly includes: a processor, and the resource handover configuration device; wherein when the resource handover configuration device is operated by the processor, a unit in the resource handover configuration device is operated.

According to still yet another aspect of the embodiments of the present application, a resource handover configuration device is provided, which includes: a capability information reporting unit, used for reporting via a terminal device, single transmission/reception capability information to at least one network service node connected to the terminal device, wherein the single transmission/reception capability information is used for configuring a discontinuous transmission/reception pattern for the terminal device and the at least one network service node corresponding to the terminal device, and the discontinuous transmission/reception pattern is used for performing single-transmission/reception-mode-based information transmission between the network service node and the terminal device.

According to still yet another aspect of the embodiments of the present application, a UE is provided, mainly including: a processor, and the resource handover configuration device; wherein when the resource handover configuration device is operated by the processor, a unit in the resource handover configuration device is operated.

According to still yet another aspect of the embodiments of the present application, a computer readable storage medium is provided for storing a computer readable instruction therein, and the computer readable instruction is used for being executed to implement steps of the resource handover configuration method.

According to still another aspect of the embodiments of the present application, a computer program is provided, which includes a plurality of computer readable instructions, and the computer readable instructions are used for being executed to implement steps of the resource handover configuration method.

Based on the resource handover configuration method, the resource handover configuration device, the network device, the UE, and the computer readable storage medium provided in this application, a practical technical solution is provided for the resource handover configuration in communication systems such as the 5G/LTE system. It sets corresponding technical solutions for dual connections, dual attachments (that is, dual residents), a network service node handover process, content contained in the single transmission/reception capability information, a reporting mode of the single transmission/reception capability information, and dynamically reported single transmission/reception capability change information, respectively, so as to ensure that the terminal device can always operate appropriately based on two air interface standards at same time. In addition, this application is also beneficial to save signaling overhead, and beneficial to configuration flexibility of the discontinuous transmission/reception pattern, and so on.

The technical solutions of the present application will be further described in detail below with reference to the accompanying drawings and embodiments.

BRIEF DESCRIPTION OF THE DRAWINGS

In order to illustrate the technical solutions of the embodiments of the present invention more clearly, the drawings needed to be used in the description of the embodiments of the present invention will be briefly introduced below. Obviously, the drawings in the following description only relate to some embodiments of the present invention. A person skilled in the art may obtain other drawings according to these drawings without any creative effort.

FIG. 10 is a schematic diagram of a table maintained in the terminal device and the network service node of the present application;

FIG. 11 is a schematic diagram of another table maintained in the terminal device and the network service node of the present application;

DETAILED DESCRIPTION

Technical solutions in the embodiments of the present invention will be clearly and completely described below in combination with the accompanying drawings in the embodiments of the present invention. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
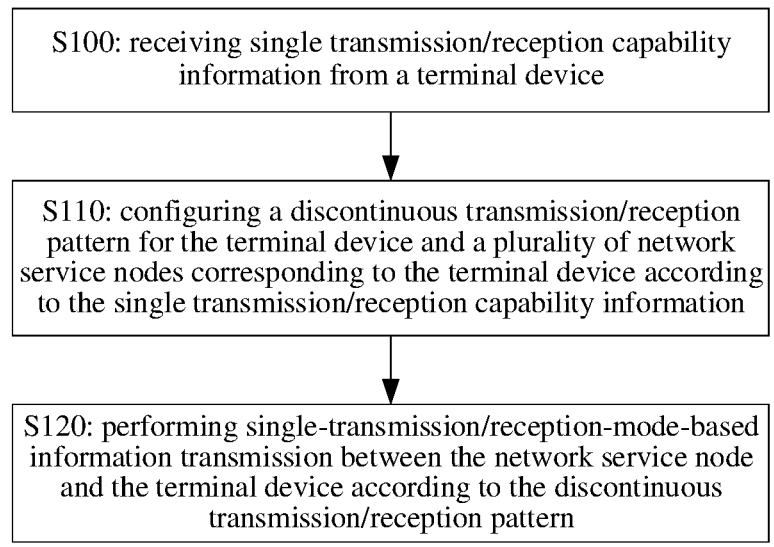
FIG. 1 is a flowchart of an embodiment of a method of the present application.

FIG. 1 is a flowchart of an embodiment of a method of the present application. As shown in FIG. 1, the method in this embodiment includes: step S100, step S110, and step S120.

S100: receiving single transmission/reception capability information from a terminal device.

In an optional example, when the terminal device in this application performs information transmission with a network service node based on a single transmission/reception mode, the terminal device may be referred to as a single transmission terminal device (such as a single transmission UE). The single transmission terminal device may refer to a terminal device that can transmit uplink signals at only one frequency within a time range.

In an optional example, the single transmission/reception capability information from the terminal device in this application may be single transmission/reception capability information that the terminal device actively reports to the corresponding network service node after establishing a connection with the network service node, for example, single transmission/reception capability information initially reported by the terminal device, and for another example, single transmission/reception capability information reported by the terminal device at regular (such as preset fixed time)/irregular time (such as random time); wherein the single transmission/reception capability information reported by the terminal device at regular/irregular time may be used for updating single transmission/reception capability information currently stored in the network service node; the single transmission/reception capability information from the terminal device in this application may also be single transmission/reception capability information reported by the terminal device according to an indication of the network service node after the terminal device establishes a connection with the corresponding network service node.

The single transmission/reception capability information from the terminal device in this application may also be the single transmission/reception capability information and corresponding power information reported by the terminal device according to the indication of the network service node after the terminal device establishes the connection with the corresponding network service node.

In an optional example, in the case that the terminal device is in a dual connection state, the terminal device may report the single transmission/reception capability information to a main node in a dual connection, or may report the single transmission/reception capability information to a secondary node in the dual connection, so that the main node and/or the secondary node in the dual connection receive the single transmission/reception capability information from the terminal device respectively. In the case that the terminal device is in a dual attachment state, the terminal device may report the single transmission/reception capability information to any Radio Access Technology (RAT) node or two RAT nodes in a dual attachment, so that at least any one of the RAT nodes in the dual attachment receives the single transmission/reception capability information from the terminal device, and learns frequency band information of other RAT node through network coordination or terminal assistance. During a process of handover between network service nodes of the terminal device, a handover source node stores the single transmission/reception capability information from the terminal device, and the handover source node can provide the stored single transmission/reception capability information from the terminal device to a handover target node, so that the target node receives the single transmission/reception capability information from the terminal device.

In an optional example, the single transmission/reception capability information reported by the terminal device usually includes: single transmission/reception capability information based on all uplink and downlink combinations formed by all frequency bands supported by the terminal device (including single transmission/reception capability information of an uplink and downlink combination based on the frequency band that does not support the single transmission/reception); it may usually also include: single transmission/reception capability information based on all uplink and downlink combinations formed by all frequency bands and channels supported by the terminal device (including single transmission/reception capability information of an uplink and downlink combination based on the frequency band and the channel that does not support the single transmission/reception); it may also include: single transmission/reception capability information of an uplink and downlink combination supporting single transmission/reception in all uplink and downlink combinations formed by all frequency bands supported by the terminal device (that is, not including the single transmission/reception capability information of the uplink and downlink combination based on the frequency band that does not support the single transmission/reception; when any one group of channel combinations in the frequency band combination needs to support single transmission, it can be considered that the frequency band combination needs to support the single transmission); and it may also include: single transmission/reception capability information of an uplink and downlink combination supporting single transmission/reception in all uplink and downlink combinations formed by all frequency bands and channels supported by the terminal device (that is, not including the single transmission/reception capability information of the uplink and downlink combination based on the frequency band and the channel that does not support the single transmission/reception). The uplink and downlink combination in this application may be a combination of an uplink frequency band and a downlink frequency band used by the terminal device, or a combination of the uplink frequency band and the channel and the downlink frequency band and the channel used by the terminal device.

In an optional example, the single transmission/reception capability information reported by the terminal device according to the indication of the network service node usually refers to: single transmission/reception capability information of a combination of an uplink and downlink frequency band specified by the network service node; or single transmission/reception capability information of a combination of the uplink and downlink frequency band and the channel specified by the network service node; or single transmission/reception capability information of the combination of the uplink and downlink frequency band specified by the network service node at a specified power; or single transmission/reception capability information of the combination of the uplink and downlink frequency band and the channel specified by the network service node at a specified power.

Specific contents contained in the single transmission/reception capability information and a reporting mode, a trigger condition of the single transmission/reception capability information reported by the terminal device temporarily and dynamically, and specific contents contained in the dynamically reported single transmission/reception capability information may refer to the following description, which will not be repeated herein.

S110: configuring a discontinuous transmission/reception pattern for the terminal device and a plurality of network service nodes corresponding to the terminal device according to the single transmission/reception capability information.

In an optional example, in the case that the received single transmission/reception capability information is single transmission capability information, the discontinuous transmission/reception pattern configured in this step is usually a discontinuous transmission pattern. In the case that the received single transmission/reception capability information is single reception capability information, the discontinuous transmission/reception pattern configured in this step is usually a discontinuous reception pattern. In the case that the terminal device is in the dual connection state, a discontinuous transmission/reception pattern configured for the terminal device and a service node is usually a discontinuous transmission/reception pattern coordinated by the main node and the secondary node. For example, after the terminal device establishes a connection with the main node in the dual connection, the main node may set the secondary node for the terminal device, and through negotiation with the secondary node, configure the discontinuous transmission/reception pattern for the terminal, and the main node provides the discontinuous transmission/reception pattern to the terminal device. In addition, a process of releasing the discontinuous transmission/reception pattern can be initiated by the main node. For example, in the case that the main node learns that a service provided by the secondary node to the terminal device is completed, the main node can instruct the terminal device and the secondary node to release the discontinuous transmission/reception pattern respectively, and the main node should also release its discontinuous transmission/reception pattern. The process of releasing the discontinuous transmission/reception pattern can also be initiated by the terminal device. For example, in the case that the service provided by the secondary node to the terminal device is completed, the terminal device transmits a request to release the discontinuous transmission/reception pattern to the main node, or it can transmit the request to release the discontinuous transmission/reception pattern to the main node and the secondary node respectively. After receiving the request, the main node releases its discontinuous transmission/reception pattern and instructs the terminal device to release its discontinuous transmission/reception pattern, and the main node can also instruct the secondary node to release its discontinuous transmission/reception pattern. It should be appreciated that, the secondary node can release its discontinuous transmission/reception pattern immediately after receiving the request to release the discontinuous transmission/reception pattern from the terminal device, and inform the main node that it has successfully released the discontinuous transmission/reception pattern. It should be appreciated that a process of coordinating the discontinuous transmission/reception pattern can be initiated by the main node or the secondary node. An operation of providing the discontinuous transmission/reception pattern to the terminal device can also be performed by the secondary node. The secondary node can also receive the single transmission/reception capability information of the terminal device. The network service node can be configured to coordinate the discontinuous transmission/reception pattern, while being configured to coordinate a gap for suspending an on-going service. In addition, the network service node can change the discontinuous transmission/reception pattern according to the single transmission/reception capability information dynamically reported by the terminal device or not use the previously configured discontinuous transmission/reception pattern. A specific example of a specific implementation can refer to the following description for FIG. 2.

In an optional example, in the case that the terminal device is in the dual attachment state, the discontinuous transmission/reception pattern configured for the terminal device is usually a discontinuous transmission/reception pattern coordinated by two RAT nodes, for example, in the case that a first RAT node attached to the terminal device receives a discontinuous transmission/reception pattern configuration request of the terminal device, the first RAT node and a second RAT node with coordination capability coordinate the discontinuous transmission/reception pattern, and the coordinated discontinuous transmission/reception pattern is provided to the terminal device by the first RAT node; for another example, in the case that the first RAT node attached to the terminal device receives the discontinuous transmission/reception pattern configuration request of the terminal device, the first RAT node configures the discontinuous transmission/reception pattern for the terminal device and provides the configured discontinuous transmission/reception pattern to the terminal device, the terminal device provides the discontinuous transmission/reception pattern it receives to the second RAT node, and the second RAT node can feedback to the terminal device information indicating whether it accepts the discontinuous transmission/reception pattern. If the second RAT node does not accept the information of the discontinuous transmission/reception pattern, the terminal device may notify the first RAT node that the first RAT node reconfigures the discontinuous transmission/reception pattern for terminal device.

In addition, the process of releasing the discontinuous transmission/reception pattern can be initiated by any RAT node. In a specific example, in the case that the first RAT node learns that a service provided by the second RAT node for the terminal device is completed, the first RAT node releases its discontinuous transmission/reception pattern, the first RAT node should also instruct the terminal device to release its discontinuous transmission/reception pattern, and the first RAT node can also instruct the second RAT node to release its discontinuous transmission/reception pattern. It should be appreciated that, the second RAT node may, when its service is completed, autonomously release its discontinuous transmission/reception pattern, and notify the first RAT node that it has successfully released its discontinuous transmission/reception pattern.

The process of releasing the discontinuous transmission/reception pattern can be initiated by any RAT node. In another specific example, in the case that the second RAT node learns that a service provided by the first RAT node for the terminal device is completed, the second RAT node releases its discontinuous transmission/reception pattern, the second RAT node should also instruct the terminal device to release its discontinuous transmission/reception pattern, and the second RAT node can also instruct the first RAT node to release its discontinuous transmission/reception pattern. It should be appreciated that, the first RAT node may, when its service is completed, autonomously releases its discontinuous transmission/reception pattern, and notify the second RAT node that it has successfully released its discontinuous transmission/reception pattern.

The process of releasing the discontinuous transmission/reception pattern can be initiated by the terminal device. In a specific example, in the case that the service provided by the first RAT node for the terminal device is completed, the terminal device transmits the request to release the discontinuous transmission/reception pattern to the second RAT node, or may transmit the request to release the discontinuous transmission/reception pattern to the first RAT node and the second RAT node respectively. After receiving the request, the second RAT node releases its discontinuous transmission/reception pattern and instructs the terminal device to release its discontinuous transmission/reception pattern, and the second RAT node may also instruct the first RAT node to release its discontinuous transmission/reception pattern after receiving the request.

The process of releasing the discontinuous transmission/reception pattern can be initiated by the terminal device. In another specific example, in the case that the service provided by the second RAT node for the terminal device is completed, the terminal device transmits the request to release the discontinuous transmission/reception pattern to the first RAT node, or may transmit the request to release the discontinuous transmission/reception pattern to the first RAT node and the second RAT node respectively. After receiving the request, the first RAT node releases its discontinuous transmission/reception pattern and instructs the terminal device to release its discontinuous transmission/reception pattern, and the first RAT node may also instruct the second RAT node to release its discontinuous transmission/reception pattern after receiving the request.

The process of releasing the discontinuous transmission/reception pattern can be initiated by the terminal device. For example, in the case that a service provided by the first/second RAT node for the terminal device is completed, the terminal device transmits the request to release the discontinuous transmission/reception pattern to the first/second RAT node, or may transmit the request to release the discontinuous transmission/reception pattern to the first RAT node and the second RAT node respectively. After receiving the request, the first/second RAT node releases its discontinuous transmission/reception pattern and instructs the terminal device to release its discontinuous transmission/reception pattern, and the first/second RAT node may also instruct the second/first RAT node to release its discontinuous transmission/reception pattern after receiving the request. It should be noted that the process of coordinating the discontinuous transmission/reception pattern may be initiated by any one of the first RAT node and the second RAT node. The network service node can be configured to coordinate the discontinuous transmission/reception pattern, while being configured to coordinate the gap for suspending the on-going service. When the first RAT node and the second RAT node release the discontinuous transmission/reception pattern, they can release the gap at the same time. Any one of the first RAT node and the second RAT node can receive the single transmission/reception capability information of the terminal device. In addition, the network service node can change the discontinuous transmission/reception pattern according to the single transmission/reception capability information dynamically reported by the terminal device or not use the previously configured discontinuous transmission/reception pattern. A specific example of the specific implementation can refer to the following description for FIG. 3.

In an optional example, during the process of handover the network service node of the terminal device, the current single transmission/reception capability information of the terminal device and the currently used discontinuous transmission/reception pattern are stored in the handover source node, the source node can provide the discontinuous transmission/reception pattern it stores and the single transmission/reception capability information of the terminal device to the handover target node, and the target node determines whether to maintain the current discontinuous transmission/reception pattern according to the received discontinuous transmission/reception pattern and the single transmission/reception capability information of the terminal device; if the target node determines to maintain the current discontinuous transmission/reception pattern, the target node may notify the terminal device (for example, notify the terminal device through the source node or directly), if the target node determines not to maintain the current discontinuous transmission/reception pattern, the target node configures a new discontinuous transmission/reception pattern or change amount for the terminal device, and provides the new discontinuous transmission/reception pattern or the change amount to the source node, and the source node provides the new discontinuous transmission/reception pattern or the change amount reconfigured by the target node to the terminal device. A specific example of the specific implementation may refer to the following description for FIG. 4. In addition, if the target node determines not to maintain the current discontinuous transmission/reception pattern, the target node may configure the change amount of the discontinuous transmission/reception pattern for the terminal device, instead of configuring the new discontinuous transmission/reception pattern for the terminal device, and provide the change amount of the configured discontinuous transmission/reception pattern to the source node, and the source node provides the change amount of the discontinuous transmission/reception pattern configured by the target node to the terminal device.

S120: performing single-transmission/reception-mode-based information transmission between the network service node and the terminal device according to the discontinuous transmission/reception pattern.

In an optional example, the main node and secondary node in the dual connection can work simultaneously on the two air interface standards according to the ON/OFF of the corresponding frequency in the discontinuous transmission/reception pattern, so that the main node and the secondary node can simultaneously provide a service for the terminal device in the case of the single transmission/reception. The first RAT node and the second RAT node in the dual attachment can operate simultaneously on the two air interface standards according to the ON/OFF of the corresponding frequency in the discontinuous transmission/reception pattern, so that the first RAT node and the second RAT node can provide the service to the terminal at the same time.

The discontinuous transmission/reception pattern in this application can usually be: Discontinuous Transmission (DTX) pattern or Discontinuous Reception (DRX) pattern. In the following description, the DTX pattern is usually used as an example for description. Those skilled in the art should clearly know that the DTX pattern in the following description may be replaced with the DRX pattern, or replaced with the DTX pattern and the DRX pattern. In addition, the DTX pattern and/or the DRX pattern in this application may also be referred to as a Time-Division Multiplexing (TDM) pattern.

Figure 2:
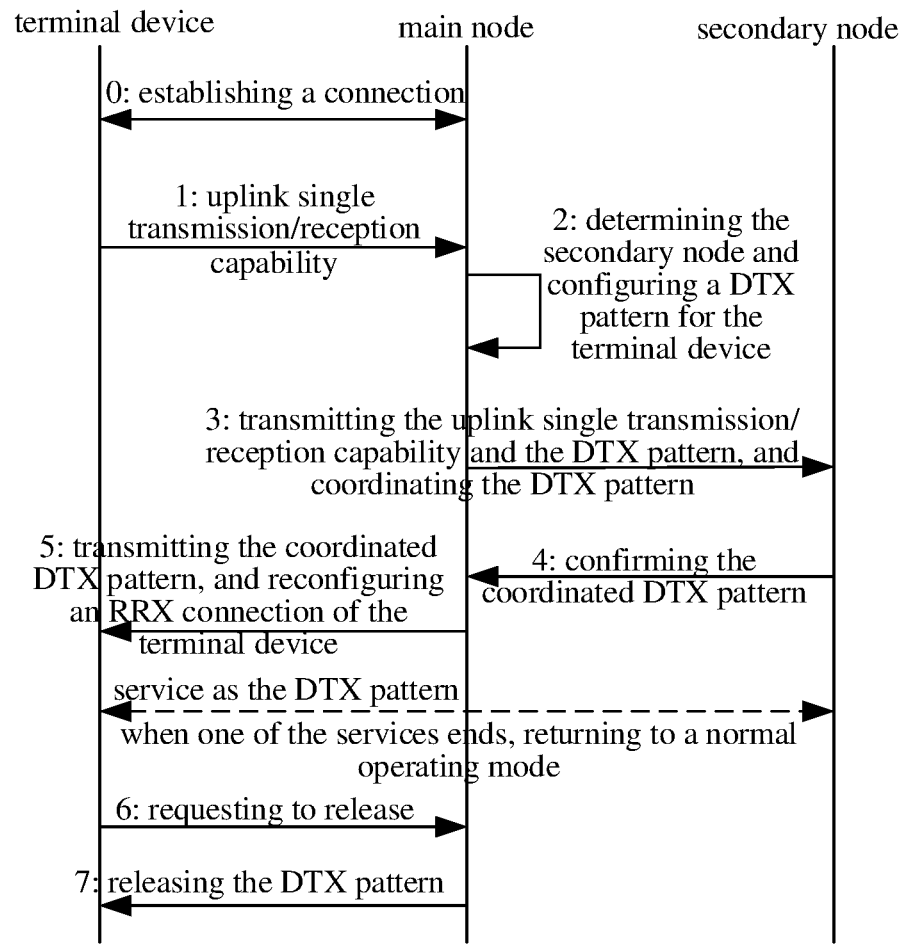
FIG. 2 is a sequence diagram of a resource handover configuration method in a dual connection application scenario of the present application.

In an optional example, a specific process of the resource handover method in a dual connection application setting of this application is shown in FIG. 2.

In FIG. 2, step 0: the UE (that is, the terminal device) and a node M (main node) establish a connection through information interaction, and the UE accesses the node M, this step is to establish the connection for the UE (UE connection setup).

Step 1: the UE transmits 1Tx (single transmission/reception capability) information to the node M. That is, the UE reports 1TX capability information (capability 1Tx) to the node M. The 1TX capability information may be referred to as static initial 1TX capability information or static 1TX capability information, etc.

Step 2: after receiving the 1TX capability information of the UE, the node M determines a node S (secondary node) of the UE and configures the DTX pattern for the UE.

Step 3: the node M transmits the 1TX capability information and the DTX pattern of the UE to the node S to coordinate the DTX pattern of the UE with the node S, that is, to coordinate the DTX pattern (DTX pattern coordination). The DTX pattern in the present application may include a time start position, time handover information, transmission duration information, uplink and downlink configuration information, and dual transmission center frequency, etc. The present application does not limit specific contents contained in the DTX pattern.

Step 4: after the node S receives the 1TX capability information and the DTX pattern of the UE, if the node S accepts the DTX pattern, the node S may transmit confirmation information to the node M, so that the DTX pattern is successfully coordinated between the node M and the node S. If the node S does not accept the DTX pattern, an operation of further coordinating the DTX pattern with the node M may be performed to finally coordinate the DTX pattern successfully. This step is to confirm the final coordinated DTX pattern with the main node (confirmation DTX pattern coordination).

Step 5: the node M transmits a successfully coordinated DTX pattern to the UE to reconfigure the Radio Resource Control (RRC) connection of the UE, that is, to reconfigure the RRC connection (RRC connection Reconfiguration).

After receiving the DTX pattern, the UE can perform single frequency information exchange with the node S and the node M according to the DTX pattern, so that the node S and the node M can simultaneously provide corresponding services to the UE based on the DTX pattern, that is, the node S and the node M can work simultaneously on the two air interface standards according to the ON/OFF of the corresponding frequency in the DTX pattern; for example, the node S and the node M respectively perform RAT-based services with the UE, etc. This step is a service based on DTX pattern (service as the DTX pattern).

When the service provided by the node S to the UE ends (such as a RAT service of the node S ends), the node M should return to a normal operating mode, or when the service provided by the node M to the UE ends, the node S should return to the normal operating mode. In the case that the node M and the node S do not intend to release the DTX pattern in a cooperative manner, it may go to step 6. In the case that the node M and the node S release the DTX pattern in the cooperative manner, when the node M senses that the RAT service of the node S ends, it may go to step 7.

Step 6: the UE actively transmits the request to release the DTX pattern to the node M and the node S (FIG. 2 only schematically illustrates the case that the UE actively transmits the request to release the DTX pattern to the node M). Go to step 7. In addition, the UE may not know whether the node M and the node S release the DTX pattern in the cooperative manner. Therefore, the UE can actively transmit the request to release the DTX pattern to the node M and the node S respectively without receiving an indication to release the DTX pattern from the node M and the node S. This step is that the UE requests release (UE may request release).

Step 7: in the case that the node M and the node S release the DTX pattern in the cooperative manner, when the node M senses that the RAT service of the node S ends, the node M can actively transmit an indication to the UE to release the DTX pattern, and the node M and the S node also release the respective DTX patterns (release the DTX pattern) (for example, the node M transmits an indication to the node S to release its DTX pattern, and the node M performs an operation to release its DTX pattern). In the case that the node M and the node S do not release the DTX pattern in the cooperative manner, the node M and the node S respectively receive a request from the UE to release the DTX pattern, and the node M and the node S release their respective DTX patterns according to the respective requests they receive, and the node M and the node S may respectively instruct the UE to release their respective DTX patterns, or only the node M may instruct the UE to release the DTX pattern.

For the above description of FIG. 2, it should be particularly noted that the DTX pattern in this application may alternatively not be configured by the main node according to the single transmission/reception capability information of the terminal device, but the DTX pattern may be coordinated by the main node and the secondary node respectively according to the single transmission/reception capability information of the terminal device. In addition, in this application, it may alternatively not provide the successfully coordinated DTX pattern to the terminal device, and the main node and the secondary node may respectively schedule the terminal device based on the coordinated DTX pattern.

It should also be noted that although the two nodes given in the embodiments corresponding to FIG. 2 are the node M and the node S, respectively, the node M and the node S may be any two nodes that do not have a main and secondary or dependency relationship.

Figure 3:
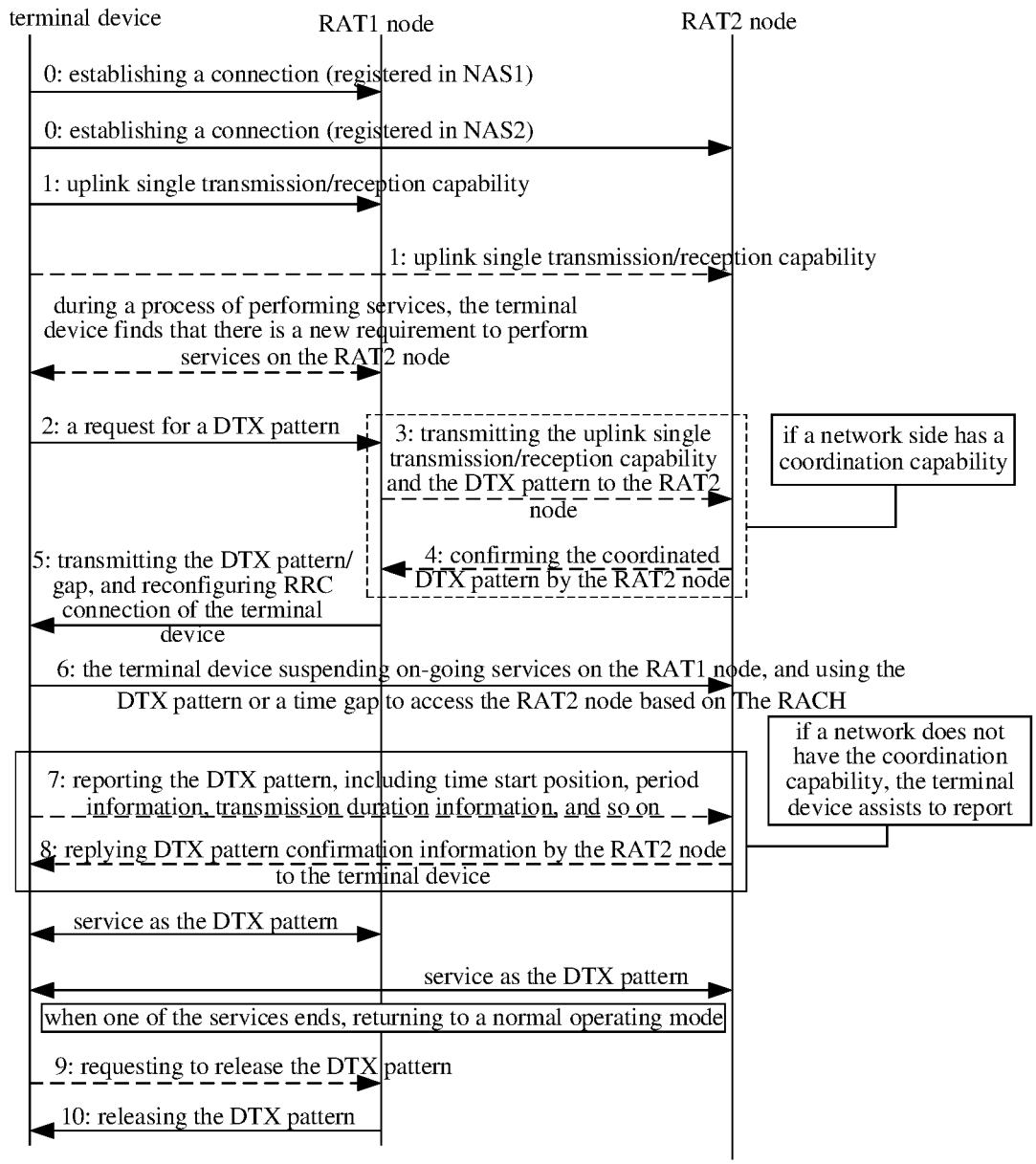
FIG. 3 is a sequence diagram of a resource handover configuration method in a dual attachment application scenario of the present application.

In an optional example, a specific process of the resource handover method in a dual attachment application scenario of this application is shown in FIG. 3.

In FIG. 3, step 0: the UE and a RAT1 node establish a connection through information interaction, that is, the UE is registered in Non-Access Stratum (NAS) 1 (NAS1 registered). A connection is established between the UE and a RAT2 node through information interaction, that is, the UE is registered in NAS2 (NAS2 registered).

Step 1: the UE transmits the 1Tx capability information to the RAT1 node. That is, the UE reports initial 1Tx capability information to the RAT1 node. Optionally, the UE may also report the initial 1Tx capability information to the RAT2 node. Similarly, the initial capability 1TX capability information reported by the UE may be referred to as static initial 1Tx capability information or static 1Tx capability information, etc.

During a process of the UE performing services on the RAT1 node, if the UE found that there is a need to perform services on the RAT2 node (On going service, UE found a need to the second RAT), go to step 2.

In a specific example, during the process of the UE performing services on the RAT1 node, by monitoring paging message, when it is learned that there is a downlink data transmission requirement of the RAT2 node, it is determined that there is a need to perform services on the RAT2 node, go to step 2;

In another specific example, when the UE has uplink data to be transmitted to the RAT2 node, it is determined that there is a need to perform services on the RAT2 node, go to step 2.

Step 2: the UE transmits a request for the DTX pattern to the RAT1 node. After receiving the request for the DTX pattern from the UE, the RAT1 node configures the DTX pattern and the gap for the UE. If the RAT1 node and the RAT2 node have the coordination capability, that is, if the network side has the coordination capability (if network can coordinate), go to step 3. If the RAT1 node and the RAT2 node do not have the coordination capability, that is, if the network side does not have the coordination capability (if network cannot coordinate), or if the RAT1 node and the RAT2 node do not adopt the cooperative manner, go to step 5.

Step 3: the RAT1 node transmits the 1Tx capability information and the DTX pattern of the UE to the RAT2 node to coordinate the DTX pattern with the RAT2 node (DTX pattern coordination for 2nd RAT). Go to step 4. In step 3, if the UE has reported the initial 1Tx capability information to the RAT2 node, the RAT1 node may transmit its configured DTX pattern to the RAT2 node.

Step 4: after the RAT2 node receives the 1Tx capability information and the DTX pattern of the UE, if the RAT2 node accepts the DTX pattern, the RAT2 node may transmit information of accepting the DTX pattern to the RAT1 node, so that the DTX pattern is successfully coordinated between the RAT1 node and the RAT2 node. Go to step 5. If the RAT2 node does not accept the DTX pattern, it may perform an operation of further coordinating the DTX pattern with the RAT1 node to finally successfully coordinate the DTX pattern. In this step, the RAT2 node confirms the final coordinated DTX pattern (2nd RAT confirmation DTX pattern coordination).

Step 5: the RAT1 node transmits the configured DTX pattern to the UE to reconfigure a RRC connection of the UE (RRC Connection Reconfiguration). Optionally, the RAT1 node may also transmit a gap for a service suspended on the RAT1 node to the UE while transmitting the DTX pattern to the UE. It should be appreciated that, the DTX pattern and the gap for the service suspended on the RAT1 node can be transmitted independently of each other.

Step 6: after receiving the DTX pattern and the gap, the UE can use the gap or the DTX pattern to suspend its on-going services on the RAT1 node, and use the DTX pattern or the gap to access the RAT2 node based on the Random Access Channel (RACH) process. This step is that the terminal device suspends currently ongoing services and accesses the RAT2 node based on the RACH using the gap or the DTX pattern (UE suspends the ongoing service and uses the gap or DTX for RACH to the 2nd RAT).

If the RAT1 node and the RAT2 node do not have the coordination capability or do not adopt a cooperative manner, go to step 7.

Step 7: the UE reports the DTX pattern from the RAT1 node to the RAT2 node, that is, reports the DTX pattern. The DTX pattern reported by the UE to the RAT2 node may include time start position (start timing), time handover information, transmission duration information, uplink and downlink configuration information, and dual transmission center frequency, etc. The present application does not limit the specific contents contained in the DTX pattern.

In the case that the RAT2 node receives the DTX pattern reported by the UE and determines to accept the DTX pattern, go to step 8.

Step 8: the RAT2 node replies DTX pattern confirmation information to the UE (2nd RAT node adopt the DTX pattern and confirm with the UE).

Whether the RAT2 node has the DTX pattern in steps 3 and 4 due to the RAT1 node and the RAT2 node have the coordination capability, or the RAT2 node has the DTX pattern after performing steps 7 and 8, the RAT1 node and the RAT2 node can simultaneously provide corresponding services to the UE based on the DTX pattern, that is, the RAT1 node and the RAT2 node can work simultaneously on the two air interface standards according to the ON/OFF of the corresponding frequency in the DTX pattern. Correspondingly, the terminal device can perform uplink alternate operation according to the DTX pattern. Optionally, when the service provided by the RAT2 node to the UE ends (such as, a RAT service of the RAT2 node ends), the RAT1 node should return to the normal operating mode. Optionally, the RAT2 node may actively release its DTX pattern, or may release the DTX pattern according to an indication of the RAT1 node, and may also release the DTX pattern according to a request of the UE. In the case that the RAT1 node and the RAT2 node do not have the coordination capability, it can go to step 9. In the case that the RAT1 node and the RAT2 node have the coordination capability, the RAT1 node can sense that the RAT service of the RAT2 node ends, and it can go to step 10.

Step 9: the UE actively transmits a request to release the DTX pattern to the RAT1 node and the RAT2 node, respectively. Go to step 10.

Step 10: in the case that the RAT1 node can sense that the RAT service on the RAT2 node ends, the RAT1 node can actively instruct the UE to release the DTX pattern. In the case that the RAT1 node receives the request from the UE to release the DTX pattern, the RAT1 node instructs the UE to release the DTX pattern according to the request, and the RAT1 node should also release its DTX pattern. In the case that the RAT2 node receives the request from the UE to release the DTX pattern, the RAT2 node releases its DTX pattern.

The above steps are described by taking the end of the service provided by the RAT2 node for the UE as an example. If the service provided by the RAT1 node for the UE ends, the processing procedure is basically same as the above description, which will not be described in detail herein.

Figure 4:
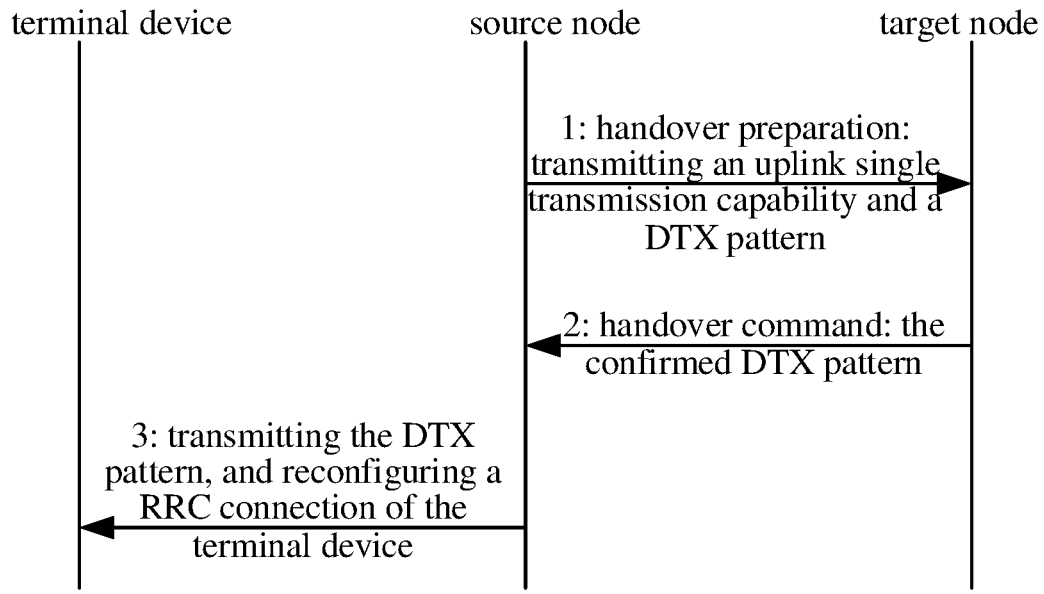
FIG. 4 is a sequence diagram of a resource handover configuration method in a node handover application scenario of the present application.

In an optional example, a specific process of the resource handover method in the handover application scenario of this application is shown in FIG. 4.

In FIG. 4, step 1: in the case that an S-Note (source node) needs to be handed over to a T-Note (target node), the S-Note performs handover preparation operation (handover preparation), and the S-Note transmits the 1Tx capability information and the DTX pattern to the T-Note. The S-Note in this step may be a main node in the dual connection, may also be a secondary node in the dual connection, or may be any RAT node in the dual attachment. In the case that the secondary node is the source node, the information interaction with the T-Note during the secondary node handover process may involve participation of the main node. The handover process involving the participation of the main node will not be described in detail herein.

Step 2: after the T-Note receives the 1Tx capability information and the DTX pattern, the T-Note can determine whether the DTX pattern needs to be modified based on the 1TX capability information and the DTX pattern. Regardless of whether the T-Note modifies the DTX pattern, the T-Note should transmit a handover command to the S-Note, and transmit its final determined DTX pattern (if any) to the S-Note.

Step 3: the S-Note transmits the DTX pattern from the T-Note to the UE to reconfigure the RRC connection of the UE. The handover operation between the S-Note and the T-Note is completed.

Figure 5:
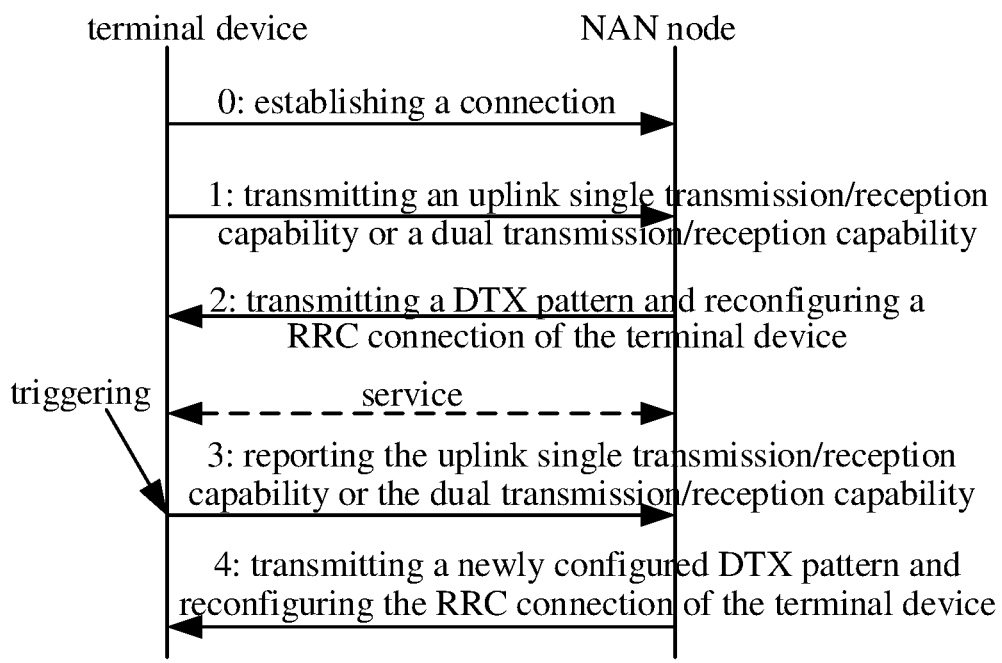
FIG. 5 is a sequence diagram of a method for dynamically reporting single transmission/reception capability information by a terminal device of the present application.

In an optional example, a specific process for the terminal device of the present application to dynamically report the single transmission/reception capability information is shown in FIG. 5.

In FIG. 5, step 0: the UE establishes a connection with the Radio Access Network (RAN) Node through information interaction.

Step 1: the UE transmits the 1TX capability information to the RAN node. Optionally, the UE may additionally transmit optional 2Tx information to the RAN node.

Step 2: after receiving the 1TX capability information of the UE, the RAN node configures the DTX pattern for the UE and transmits the DTX pattern to the UE to reconfigure the RRC connection of the UE.

After receiving the DTX pattern, the UE can perform single frequency information interaction with the RAN node according to the DTX pattern, so that the RAN node can provide the UE with corresponding services based on the DTX pattern.

When the UE detects that the triggering condition of the dynamic report is met, go to step 3. That is, when the UE detects that initial single transmission/reception capability information reported by the UE has changed, go to step 3.

Step 3: the UE reports the changed single transmission/reception capability information in the initial single transmission/reception capability information to the RAN node; the UE reports the single transmission/reception capability change information to the RAN node, and contents of the single transmission/reception capability information that has not changed may not need to be reported.

The change in the above-mentioned single transmission/reception capability may include: information about the frequency band or the channel combination changing from supporting the 1Tx to no longer support the 1Tx (such as changing to optional 2Tx information), or may include: information about the frequency band or the channel combination changing from not supporting 1Tx (such as supporting optional 2Tx information) to support the 1Tx.

Step 4: after receiving the single transmission/reception capability information reported by UE, the RAN node can configure the DTX pattern for the UE again and transmit the newly configured DTX pattern to the UE to reconfigure the RRC connection of the UE.

In an optional example, the reporting trigger condition in this application is set based on a factor that causes interference of the terminal device to change, and the dynamically reported single transmission/reception capability information is used for updating the single transmission/reception capability information stored in the network service node. Optionally, after receiving an indication of capability change, it may be considered that the stored single transmission/reception capability information is reversed. The triggering conditions for reporting in this application include at least one of the following:

1. A transmission power of an uplink frequency band channel carrier is greater than a first predetermined power or less than a second predetermined power.

2. A network deployment scheme accessed by the terminal device belongs to a predetermined deployment scheme; for example, a network deployment scheme of Band1 is a macro station, and a network deployment scheme of Band2 is a micro site, and in the uplink and downlink combination where the Band1 and the Band2 are located, whether the terminal device supports the single transmission/reception is set to support the single transmission/reception, then it can be changed to support dual transmission/reception by dynamic reporting; for another example, the network deployment scheme of the Band1 is a macro station, and the network deployment scheme of the Band2 is also a macro station, and in the uplink and downlink combination where the Band1 and the Band2 are located, whether the terminal device supports the single transmission/reception is set to support the dual transmission/reception, then it can be changed to support the single transmission/reception by dynamic reporting. In addition, the network deployment scheme may be provided by the network service node to the terminal device through a mode such as a system broadcast message or dedicated signaling.

3. A deployment frequency of the plurality of network service nodes accessed by the terminal device belongs to a predetermined frequency;

4. Coverage radiuses of a plurality of networks accessed by the terminal device are partially larger than a first predetermined radius and/or partially smaller than a second predetermined radius; the first predetermined radius is larger than the second predetermined radius; in addition, coverage radius information of the network can be provided by the network service node to the terminal device through a mode such as the system broadcast message or the dedicated signaling.

5. A power transmission reference value of the network service node accessed by the terminal device is greater than a third predetermined power or less than a fourth predetermined power. In addition, a power transmission reference value of the network service node may be provided by the network service node to the terminal device through the mode such as the system broadcast message or the dedicated signaling.

It can be known from the foregoing description of FIG. 5 that, in the present application, when interference of the uplink and downlink combination of the terminal device changes, the network service node may learn the change in time, so that the network service node can reconfigure the DTX pattern of the terminal device based on the change, the terminal device can avoid impact of interference on a downlink channel in time, and enable the terminal device to adopt better data transmission efficiency in time; therefore, this application is conducive to ensuring that the terminal device can always operate appropriately based on the two air interface standards at the same time.

Figure 6:
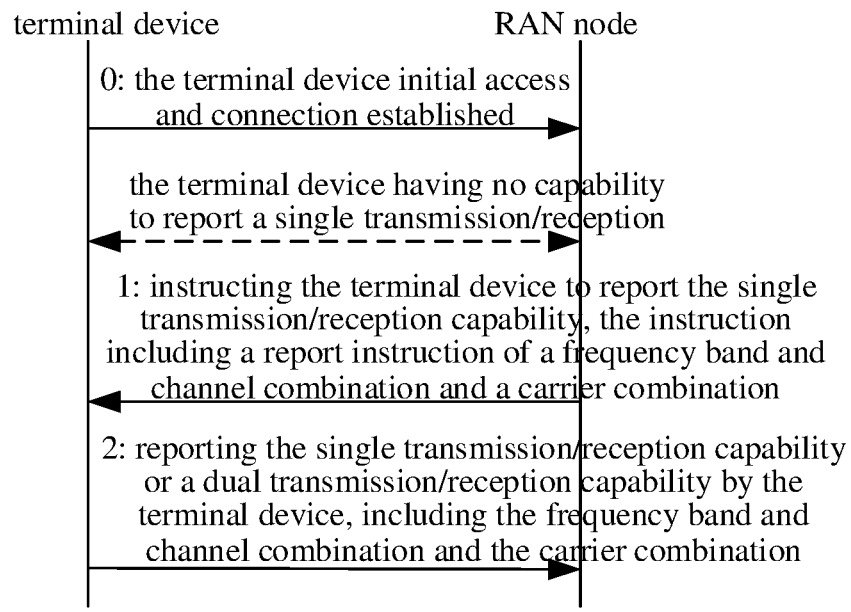
FIG. 6 is a sequence diagram of a method for reporting the single transmission/reception capability information by the terminal device of the present application according to an indication of a network service node.

In an optional example, a specific process for the terminal device of the present application to report the single transmission/reception capability information according to the indication of the network service node is shown in FIG. 6.

In FIG. 6, step 0: a connection is established between the UE and the RAN node through information interaction. The UE does not actively report the single transmission/reception capability information to the RAN node after the connection is successfully established (UE capability not reported yet). This step is that terminal device initially accesses and connection is established (UE initial access and connection established).

Step 1: the RAN node transmits an indication of reporting the single transmission/reception capability to the UE. The indication includes the specified frequency band channel combination information and a reported power indication to indicate that the RAN node designates the UE to report to it the single transmission/reception capability information and corresponding power level of the corresponding frequency band and the corresponding channel.

Step 2: after receiving the reported single transmission/reception capability indication, the UE reports the single transmission/reception capability information of the corresponding frequency band and channel combination to the UE according to the frequency band information and channel information included in the indication. It should be appreciated that, it is also possible to report the single transmission/reception capability information and the corresponding power level of the corresponding frequency band and the channel combination.

Figure 7:
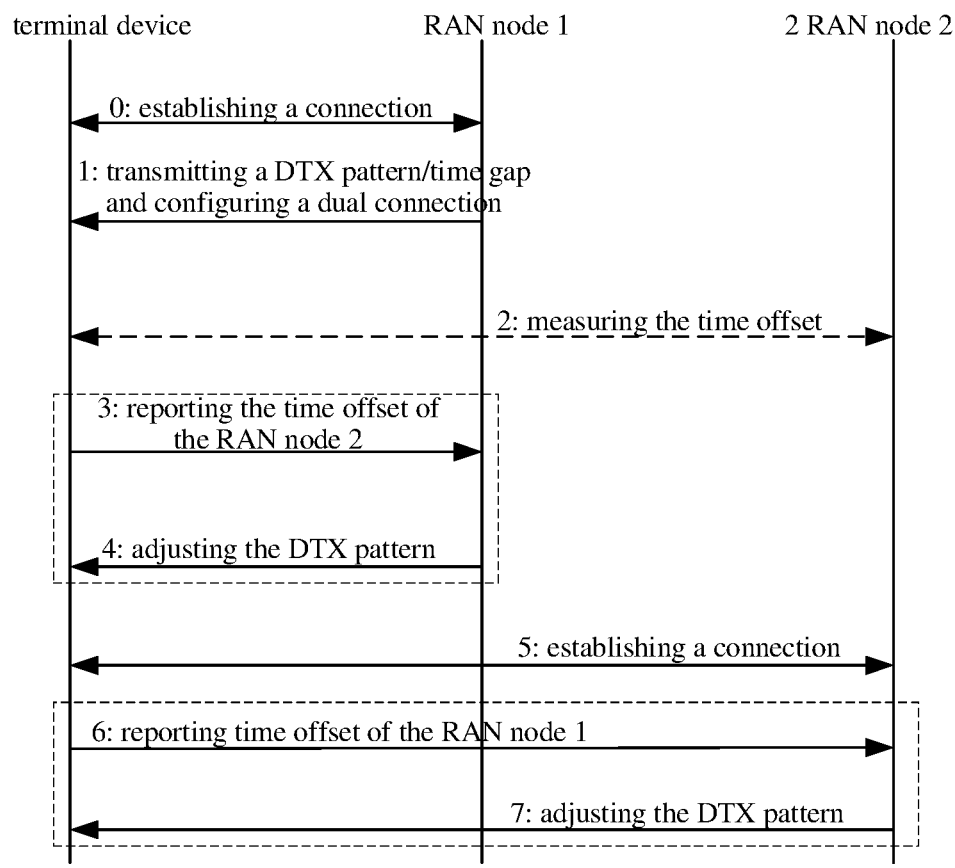
FIG. 7 is a sequence diagram of a method for reporting auxiliary information by the terminal device of the present application.

In an optional example, a specific process of reporting auxiliary information by the terminal device of the present application is shown in FIG. 7.

In FIG. 7, step 0: a connection is established between the UE and the RAN node 1 through information interaction (connection established).

Step 1: since the UE needs to be connected respectively to the RAN node 1 and the RAN node 2 to perform services simultaneously, the RAN node 1 configures the DTX pattern for the UE and transmits the DTX pattern to the UE to reconfigure the RRC connection of the UE. Optionally, the RAN node 1 may also transmit a gap for the service suspended on the RAN node 1 to the UE while transmitting the DTX pattern to the UE. It should be appreciated that, the DTX patterns and the gap for services suspended on RAN node 1 may be transmitted independently of each other.

In the case that the RAN node 1 and the RAN node 2 do not have the coordination capability or do not use the coordination capability, go to step 2.

Step 2: the UE measures time information for synchronizing different network service nodes. Specifically, the UE can measure time information of the RAN node 1, can also measure time information of the RAN node 2, and can also measure time offset information with the RAN node 2 and the RAN node 1, that is, measure the time offset information (measure the timing offset).

Optionally, in this application, it goes directly to step 3 or directly to step 5 after the step 2.

Step 3: the UE reports the measured time information of the RAN node 2 or information about the time offset between the RAN node 2 and the RAN node 1 to RAN node 1 (reports the 2nd node timing offset). Go to step 4.

Step 4: the RAN node 1 configures the DTX pattern for the UE before adjusting according to the time information or the time offset information from the UE, that is, adjusts the DTX pattern, and transmits the adjusted DTX pattern to the UE. Go to step 5.

Step 5: the UE and the RAN node 2 establish a connection through information interaction.

In the case that the step 3 and the step 4 are performed above, the UE may transmit the adjusted DTX pattern from the RAN node 1 to the RAN node 2; this process ends.

If the above step 3 and the step 4 are not performed, go to step 6.

Step 6: the UE may report the DTX pattern from the RAN node 1 and its measured time information of RAN node 1 or the time offset information (report the 1nd node timing offset) between the RAN node 2 and the RAN node 1 to the RAN node 2. Go to step 7.

Step 7: the RAN node 2 adjusts the DTX pattern from the UE according to the time information (such as the time offset information) from the UE, and transmits the adjusted DTX pattern to the UE. The UE may provide a DTX pattern from the RAN node 2 to the RAN node 1 to update a DTX pattern stored in the RAN node 1.

In this application, the single transmission/reception capability information reported by the UE to the network service node usually includes at least one of the following:

1. Information indicating whether radio frequency retuning is needed when an uplink and downlink combination formed by a frequency band is used by the terminal device for single transmission/reception, and time required for the radio frequency retuning in the case that the radio frequency retuning is needed;

2. Information indicating whether the radio frequency retuning is needed when an uplink and downlink combination formed by the frequency band and a channel is used by the terminal device for the single transmission/reception, and time required for the radio frequency retuning in the case that the radio frequency retuning is needed;

3. Information indicating isolation degree of an interference source to an interfered object when an uplink and downlink combination formed by a frequency band is used by the terminal device for the single transmission/reception;

4. Information indicating isolation degree of the interference source to the interfered object when an uplink and downlink combination formed by a frequency band and a channel is used by the terminal device for the single transmission/reception;

5. Information indicating an order of intermodulation interference of the interference source to the interfered object when an uplink and downlink combination formed by a frequency band is used by the terminal device for the single transmission/reception;

6. Information indicating an order of the intermodulation interference of the interference source to the interfered object when an uplink and downlink combination formed by the frequency band and a channel is used by the terminal device for the single transmission/reception;

7. Information indicating whether the single transmission/reception is supported by the terminal device when an uplink and downlink combination formed by the frequency band is used by the terminal device for the single transmission/reception;

8. Information indicating whether the single transmission/reception is supported by the terminal device when an uplink and downlink combination formed by the frequency band and the channel is used by the terminal device for the single transmission/reception.

The information used to indicate whether radio frequency retuning is needed when the terminal device uses the uplink and downlink combination formed by the frequency band and the channel for the single transmission/reception can be represented by 1 bit; the above information used to indicate whether the radio frequency retuning is needed when the terminal device uses the uplink and downlink combination formed by the frequency band and the channel for the single transmission/reception can be represented by 1 bit. In addition, the information used to indicate whether the terminal device supports the single transmission/reception when the terminal device uses the uplink and downlink combination formed by the frequency band can be represented by 1 bit; the information used to indicate whether the terminal device supports the single transmission/reception when the terminal device uses the uplink and downlink combination formed by the frequency band and the channel can be represented by 1 bit.

The information used to indicate whether the terminal device supports the single transmission/reception when the terminal device uses the uplink and downlink combination formed by the frequency band for the single transmission/reception can specifically express: the terminal device supports the single transmission/reception when using the uplink and downlink combination formed by the frequency band, or the terminal device supporting the dual transmission/reception when using the uplink and downlink combination formed by the frequency band is optional, or dual transmission/reception when the terminal device uses the uplink and downlink combination formed by the frequency band; wherein the terminal device supporting the single transmission/reception when using the uplink and downlink combination formed by the frequency band can indicate at least one of the following six meanings:

1. When the terminal device uses the uplink and downlink combination formed by the frequency band for the single transmission/reception, the terminal device recommends the network service node to schedule the terminal device according to the single transmission/reception mode;

2. When the terminal device uses the uplink and downlink combination formed by the frequency band for the single transmission/reception, if the network service node schedules the terminal device node according to the dual transmission/reception mode, it is very likely that downlink performance of the terminal device is lower than expected performance, that is, the downlink performance of the terminal device may be severely affected;

3. Whether simultaneous dual transmission/reception transmission is supported by the terminal device in a predefined frequency band;

4. Whether the simultaneous dual transmission/reception transmission is supported by the terminal device in a predefined frequency band and a predefined channel;

5. The single transmission/reception mode is supported by the terminal device;

6. Only the single transmission/reception mode is supported by the terminal device.

The information used to indicate whether the terminal device supports the single transmission/reception when the terminal device uses the uplink and downlink combination formed by the frequency band and the channel for the single transmission/reception can specifically express: the terminal device supports the single transmission/reception when using the uplink and downlink combination formed by the frequency band and the channel, or the terminal device supporting that the dual transmission/reception when using the uplink and downlink combination formed by the frequency band and the channel is optional, or dual transmission/reception when the terminal device uses the uplink and downlink combination formed by the frequency band and the channel; wherein the terminal device supporting the single transmission/reception when using the uplink and downlink combination formed by the frequency band and the channel can indicate at least one of the following six meanings:

1. When the terminal device uses the uplink and downlink combination formed by the frequency band and the channel for the single transmission/reception, the terminal device recommends the network service node to schedule the terminal device according to the single transmission/reception mode;

2. When the terminal device uses the uplink and downlink combination formed by the frequency band and the channel for the single transmission/reception, if the network service node schedules the terminal device node according to the dual transmission/reception mode, it is very likely that downlink performance of the terminal device is lower than expected performance, that is, the downlink performance of the terminal device may be severely affected;

3. Whether simultaneous dual transmission/reception transmission is supported by the terminal device in a predefined frequency band;

4. Whether the simultaneous dual transmission/reception transmission is supported by the terminal device in a predefined frequency band and a predefined channel;

5. The single transmission/reception mode is supported by the terminal device;

6. Only the single transmission/reception mode is supported by the terminal device.

In an application scenario in which the UE initially/regularly/irregularly reports the single transmission/reception capability information to the network service node: uplink and downlink combinations formed by the frequency band supported by the terminal device in this application generally include: all uplink and downlink combinations formed by all frequency band supported by the terminal device; uplink and downlink combinations formed by the channel in the frequency band supported by the terminal device generally include: all uplink and downlink combinations formed by all channels in all frequency bands supported by the terminal device.

In an application scenario of the single transmission/reception capability information dynamically reported by the UE to the network service node: uplink and downlink combinations formed by the frequency band supported by the terminal device in this application generally include: the terminal device supports uplink and downlink combinations where the single transmission/reception information changes, that is, in a dynamic reporting process, it is generally not necessary to report all uplink and downlink combinations, but to select uplink and downlink combinations with changes in information that the terminal device supports single transmission/reception for reporting. The uplink and downlink combination in this application is usually a combination of two uplinks and one downlink, but it should be noted that it is not limited to this combination.

Figure 8:
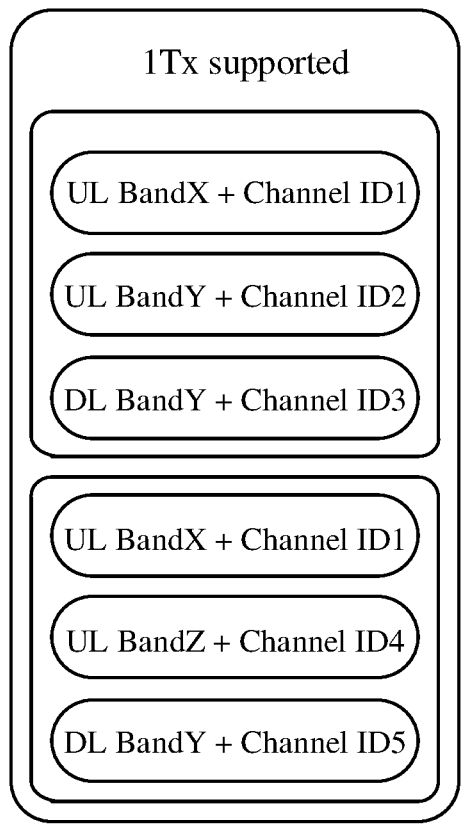
FIG. 8 is a schematic diagram of a mode for forming the single transmission/reception capability information by the terminal device of the present application.

In this application, the UE forms the single transmission/reception capability information and reports to the network service node in various modes. Here are several examples of modes in which the UE forms the single transmission/reception capability information and reports it:

Mode 1: the uplink and downlink combination formed by the frequency band and the channel supported by the terminal device forms a set of data. The set of data usually includes: an uplink frequency band identifier (such as an uplink frequency band number), an uplink channel identifier (such as an uplink channel number), an downlink frequency band identifier (such as a downlink frequency band number), downlink channel identifier (such as a downlink channel number), whether the radio frequency retuning is needed, time required for the radio frequency retuning, the isolation degree of the interference source to the interfered object, the order of the intermodulation interference and whether the single transmission/reception is supported by the terminal device, and etc. As shown in FIG. 8, uplink frequency band X+channel code 1 (Uplink (UL) BandX+Channel ID1), uplink frequency band Y+channel code 2 (UL BandY+Channel ID2), and Downlink (DL) BandY+Channel ID3 form an uplink and downlink combination, UL BandX+Channel ID1, UL BandZ+Channel ID4 and DL BandY+Channel ID5 form another uplink and downlink combination. For these two combinations, data groups should be set separately. After the data groups of all the uplink and downlink combination are successfully set, all data groups are reported to the network service node, or only whether the terminal device supports 1Tx may be reported (1Tx supported).

Mode 2: an uplink and downlink combination formed by the frequency band supported by the terminal device forms a set of data. The set of data usually includes: an uplink frequency band identifier (such as an uplink frequency band number), downlink frequency band identifier (such as a downlink frequency band number), whether the radio frequency retuning is needed, time required for the radio frequency retuning, the isolation degree of the interference source to the interfered object, whether the single transmission/reception is supported by the terminal device, etc. For example, FIG. 8 can be transformed into: the UL BandX, the UL BandY, and the UL BandY forms an uplink and downlink combination, and the UL BandX, the UL BandZ, and the UL BandY form another uplink and downlink combination. For these two combinations, data groups should be set respectively. In the data group, if any two downlink carrier bandwidths and one downlink carrier bandwidth cause interference that may cause data transmission performance to decline, whether the terminal device in the data group supporting the single transmission/reception should be set to not support the single transmission/reception or support optional dual transmission/reception, or only whether the terminal device supports 1Tx may be reported.

Mode 3: for the uplink and downlink combination formed by the frequency band supported by the terminal device, channels in the two frequency bands in the combination form uplink channel combinations. For each of the uplink channel combinations, a plurality of channels in the frequency band in the uplink and downlink combination are set respectively as downlink channels corresponding to the uplink channel combination, and a set of data is formed for each of the downlink channels. The set of data includes at least: whether the radio frequency retuning is needed, time required for the radio frequency retuning, and the isolation degree of the interference source to the interfered object, whether the single transmission/reception is supported by the terminal device, etc. Alternatively, only whether the terminal device supports 1Tx may be reported.

Figure 9:
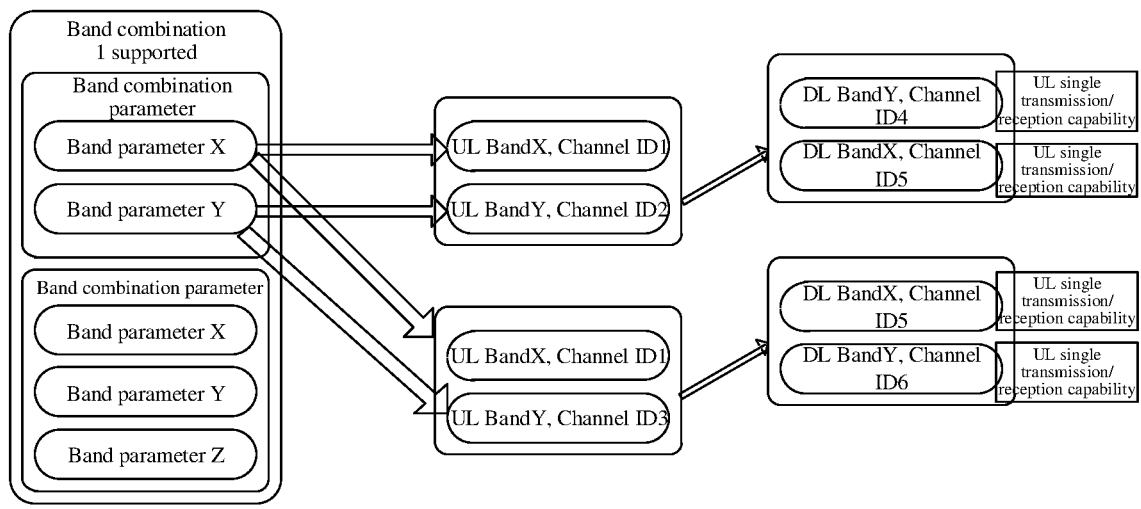
FIG. 9 is a schematic diagram of another mode for forming the single transmission/reception capability information by the terminal device of the present application.

As shown in FIG. 9, the BandX and the BandY form an uplink and downlink combination, and the BandX, the BandZ, and the BandY form another uplink and downlink combination; For an uplink and downlink combination formed by the BandX and the BandY, this application may combine Channel ID1 in the UL BANDX and Channel ID2 in the UL BANDY to form an uplink channel combination. For this uplink channel combination, in this application, it can set Channel ID4 in the BANDX as the downlink channel, and a set of data can be set for this downlink channel. In this application, it can also set the Channel ID5 in the BANDX as the downlink channel, and a set of data can be set for the downlink channel; in addition, for the uplink and downlink combination formed by the BandX and the BandY, in this application, it may combine Channel ID1 in the UL BANDX and Channel ID3 in the UL BANDY to form an uplink channel combination. For this uplink channel combination, in this application, it can set Channel ID5 in the BANDX as the downlink channel, and a set of data can be set for this downlink channel. In this application, it also set Channel ID6 in the BANDY as the downlink channel, and a set of data can be set for this downlink channel.

Method 4: forming the single transmission/reception capability information based on pre-stored tables in the terminal device and the network service node, and reporting it to the network service node. That is, the single transmission/reception capability information is reported in a form of a correspondence between predefined uplink and downlink combination identifiers and single transmission/reception capability information groups, and the predefined uplink and downlink combination identifiers are based on the frequency band and the channel; specifically, each of the predefined uplink and downlink combination identifiers based on the frequency band and the channel corresponds to at least one predefined uplink and downlink combination based on the frequency band and the channel, and each of the terminal device and the network service node maintains a correspondence between the predefined uplink and downlink combination identifiers based on the frequency band and the channel and predefined uplink and downlink combinations based on the frequency band and the channel, the single transmission/reception capability information group corresponding to the predefined uplink and downlink combination identifier based on the frequency band and the channel is: single transmission/reception capability information corresponding to the predefined uplink and downlink combination based on the frequency band and the channel corresponding to the predefined uplink and downlink combination identifier based on the frequency band and the channel.

As shown in FIG. 10, columns 2-4 in a table indicate two uplink frequency bands+channel identifiers and one downlink frequency band+channel identifier, and each row indicates the uplink and downlink combination formed by the frequency band and the channel. The first column in the table can be understood as identifiers of the uplink and downlink combination formed by the frequency band and the channel, such as an index/number/sequence number/keyword, as shown in FIG. 10:

Identifier 1 (entry is 1) corresponds to an uplink and downlink combination formed by Channel ID1 in the UL BANDX, Channel ID2 in the UL BANDY, and Channel ID3 in the DL BANDY;

Identifier 2 corresponds to an uplink and downlink combination formed by Channel ID2 in the UL BANDX, Channel ID2 in the UL BANDY, and Channel ID1 in DL BANDW;

Identifier 3 corresponds to an uplink and downlink combination formed by Channel ID1 in the UL BANDY, Channel ID3 in the UL BANDZ, Channel ID3 in the DL BANDY, and an uplink and downlink combination formed by Channel ID1 in the UL BANDY, Channel ID3 in the UL BANDZ, and Channel ID2 in UL BANDW;

Identifier 4 corresponds to an uplink and downlink combination formed by Channel ID2 in the UL BANDY, Channel ID3 in the UL BANDW, Channel ID2 in the DL BANDW, and an uplink and downlink combination formed by Channel ID2 in the UL BANDY, Channel ID3 in the UL BANDW and Channel ID1 in DL BANDP.

In this application, it can set a set of data for each uplink and downlink combination, and the set of data can generally include at least: whether the radio frequency retuning is needed, time required for the radio frequency retuning, the isolation degree of the interference source to the interfered object, and whether the terminal device supports the single transmission/reception, etc., it can also only include whether the terminal device supports the single transmission/reception, that is, only whether the terminal device supports 1Tx is reported; when the UE reports to the network service node, the UE may select all data groups that the terminal device supports the single transmission/reception, and report the data groups and the corresponding uplink and downlink combination identifiers to the network service node, and the network service node can find the frequency band and channel information contained in the uplink and downlink combination by using the reported identifier of the uplink combination according to its locally maintained table. In some cases, this mode can reduce signaling overhead. For example, when the table includes a large number of rows and the terminal device supports a small number of the single transmissions/receptions, this method can reduce the signaling overhead.

In this mode, it can be changed to apply this mode to a fixed combination of frequency bands, that is, under a certain combination of frequency bands, establishing corresponding tables for different channel combinations, and using an index or bitmap to indicate whether the single transmission/reception is supported under a certain channel combination within the combination of frequency bands.

In addition, in this mode, this application can form each uplink and downlink combined data group into a bitmap, so that instead of transmitting the identifier of the uplink and downlink combination to the network service node, the bitmap can be transmitted to the network service node. The network service node may obtain two uplink frequency bands+channels and one downlink frequency band+channel corresponding to each data group by matching each data group in the bitmap with an entry in a table maintained locally. It should be appreciated that, in this application, it can form a bitmap for each piece of data in the data group, for example, whether the terminal device supports the single transmission/reception forms a binary bitmap represented by 0 and 1. In some cases, the mode where bitmaps are formed can reduce signaling overhead.

FIG. 11 is a variation of FIG. 10, that is, the correspondence between the predefined uplink and downlink combination identifiers based on the frequency band and the channel and the predefined uplink and downlink combinations based on the frequency band and the channel maintained by each of the terminal device and the network service node may further include: the predefined uplink and downlink combination identifiers based on the frequency band and the channel, and a correspondence between the predefined uplink and downlink combination based on the frequency band and the channel and predefined transmission powers based on the frequency band and the channel, wherein the predefined transmission power based on the frequency band and the channel is mainly used by a network side for determining downlink interference of the terminal device under scheduling of the predefined transmission power, thereby determining whether the single transmission/reception can be used to schedule the terminal device in this case.

It can be clearly learned from FIG. 11 that UL power is added to the uplink frequency band+channel in the respective tables maintained by the terminal device and the network service node, that is, when the terminal device reports the index/bitmap to the network service node, each data group in the bitmap should include the UL power. The UL power in FIG. 11 is mainly used by a network service node to autonomously determine whether it is necessary to update whether the terminal device supports the single transmission/reception in the single transmission/reception capability information of the terminal device, so that this application may not require the terminal device to dynamically report the single transmission/reception capacity information. During the process of regularly/regularly reporting or dynamically reporting based on trigger conditions, only the identifier (such as the entry in FIG. 10 or FIG. 11) can be reported. Optionally, the reported entry can be understood as indication information that makes the network service node consider whether the terminal device supports the single transmission/reception and hands over among its multiple possible values.

Mode 5: forming the single transmission/reception capability information based on pre-stored tables in the terminal device and the network service node, and reporting it to the network service node. That is, the single transmission/reception capability information is reported in a form of predefined uplink and downlink combination identifiers based on a frequency band and a correspondence between predefined uplink and downlink combination identifiers based on a channel and single transmission/reception capability information groups, wherein each of the predefined uplink and downlink combination identifiers based on the frequency band corresponds to at least one or a plurality of predefined uplink and downlink combination based on the frequency band, and each of the predefined uplink and downlink combination identifiers based on the channel corresponds to at least one or a plurality of predefined uplink and downlink combination based on the channel, and each of the terminal device and the network service node maintains a correspondence between the predefined uplink and downlink combination identifiers based on the frequency band and the predefined uplink and downlink combinations based on the frequency band, and a correspondence between the predefined uplink and downlink combination identifiers based on the channel and the predefined uplink and downlink combinations based on the channel, the single transmission/reception capability information group corresponding to the predefined uplink and downlink combination identifiers based on the frequency band and the predefined uplink and downlink combination identifiers based on the channel is: single transmission/reception capability information corresponding to a predefined uplink and downlink combination based on the frequency band and the channel, and the predefined uplink and downlink combination based on the frequency band and the channel is formed by combining the uplink and downlink combination corresponding to the predefined uplink and downlink combination identifier based on the frequency band and the uplink and downlink combination corresponding to the predefined uplink and downlink combination identifier based on the channel. The correspondence between the predefined uplink and downlink combination identifiers based on the channel and the predefined uplink and downlink combinations based on the channel maintained by each of the terminal device and the network service node includes: the predefined uplink and downlink combination identifiers based on the channel, and a correspondence between the predefined uplink and downlink combinations based on the channel and predefined transmission powers based on the frequency band and the channel; wherein the predefined transmission power based on the frequency band and the channel is used by a network side for determining downlink interference of the terminal device under scheduling of the predefined transmission power.

From the above description, it can be known that in the mode 5, the terminal device and the network service node each maintain two types of tables. The first type of table can be considered as: replacing columns 2-4 in FIG. 10 with two uplink frequency band identifiers and one downlink frequency band identifier, respectively. The second type of table can be considered as: replacing columns 2-4 in FIG. 10 with two uplink channel identifiers and one downlink channel identifier, respectively. A quantity of tables of the second type is usually related to a quantity of records in the table of the first type. For example, each record in the table of the first type corresponds to a table of the second type. Thus, in this application, the quantity of records that are included in the first type of table is equal to the quantity of second type tables.

Similarly, there is also a variation of the mode 5, that is, the correspondence between the predefined uplink and downlink combination identifiers based on the channel and the predefined uplink and downlink combinations based on the channel maintained by each of the terminal device and the network service node may further include: the predefined uplink and downlink combination identifiers based on the channel, and a correspondence between the predefined uplink and downlink combinations based on the channel and predefined transmission powers/intermodulation interference/receiving sensitivity/sensitivity reducing based on the frequency band and the channel; wherein parameters such as the predefined transmission power based on the frequency band and the channel are used by a network side for determining downlink interference of the terminal device under scheduling of the predefined transmission power. In addition, there is another variation of the mode 5, wherein the correspondence between the predefined uplink and downlink combination identifiers based on the channel and the predefined uplink and downlink combinations based on the channel maintained by each of the terminal device and the network service node may include: a correspondence between a frequency band uplink and downlink combination (such as a combination of frequency band 1 and frequency band 2) and an uplink and downlink combination of the frequency band and the channel formed by the uplink and downlink combination based on the frequency band.

The several modes exemplified above may be applicable to the initial single transmission/reception capability information formed by the terminal device, and may also be applicable to the single transmission/reception capability information dynamically reported by the terminal device. However, when forming the single transmission/reception capability information dynamically reported by the terminal device, only the single transmission/reception capability information that has changed may be selected for reporting, that is, it is possible to report only the transmission/reception capability change information to the network service node.

In a first optional example, the dynamically reported single transmission/reception capability information may include: a predefined uplink and downlink combination identifier based on the frequency band (that is, an index value of the predefined uplink and downlink combination based on the frequency band), and the predefined uplink and downlink combination identifier based on the frequency band is specifically: information indicating whether the terminal device supports a predefined uplink and downlink combination identifier based on the frequency band corresponding to an uplink and downlink combination based on the frequency band in which the single transmission/reception changes.

In a second optional example, the dynamically reported single transmission/reception capability information may include: a predefined uplink and downlink combination identifier based on the frequency band and the channel (that is, an index value of a predefined uplink and downlink combination based on the frequency band and the channel, such as an entry in FIG. 10), and the predefined uplink and downlink combination identifier based on the frequency band and the channel is specifically: information indicating whether the terminal device supports a predefined uplink and downlink combination identifier based on the frequency band and the channel corresponding to an uplink and downlink combination based on the frequency band and the channel in which the single transmission/reception changes.

In a third optional example, the dynamically reported single transmission/reception capability information may include: a predefined uplink and downlink combination identifier based on the frequency band and a predefined uplink and downlink combination identifier based on the channel (that is, two index values are provided, wherein one is frequency band index value, and the other one is channel index value). The predefined uplink and downlink combination identifier based on the frequency band and the predefined uplink and downlink combination identifier based on the channel are specifically: information indicating whether the terminal device supports a predefined uplink and downlink combination identifier based on the frequency band corresponding to an uplink and downlink combination based on the frequency band and a predefined uplink and downlink combination identifier based on the channel corresponding to an uplink and downlink combination based on the channel in which the single transmission/reception changes.

In a fourth optional example, the dynamically reported single transmission/reception capability information may include: a predefined uplink and downlink combination identifier based on the frequency band (that is, an index value of the predefined uplink and downlink combination based on the frequency band) and whether the terminal device supports the single transmission/reception information (such as represented by 1 bit), the predefined uplink and downlink combination identifier based on the frequency band is specifically: information indicating whether the terminal device supports a predefined uplink and downlink combination identifier based on the frequency band corresponding to an uplink and downlink combination based on the frequency band in which the single transmission/reception changes.

In a fifth optional example, the dynamically reported single transmission/reception capability information may include: a predefined uplink and downlink combination identifier based on the frequency band and the channel (that is, an index value of a predefined uplink and downlink combination based on the frequency band and the channel, such as an entry in FIG. 10) and whether the terminal device supports the single transmission/reception information, and the predefined uplink and downlink combination identifier based on the frequency band and the channel is specifically: information indicating whether the terminal device supports a predefined uplink and downlink combination identifier based on the frequency band and the channel corresponding to an uplink and downlink combination based on the frequency band and the channel in which the single transmission/reception changes.

In a sixth optional example, the dynamically reported single transmission/reception capability information may include: a predefined uplink and downlink combination identifier based on the frequency band and a predefined uplink and downlink combination identifier based on the channel (that is, two index values are provided, wherein one is frequency band index value, and the other one is channel index value) and whether the terminal device supports the single transmission/reception information, and the predefined uplink and downlink combination identifier based on the frequency band and the predefined uplink and downlink combination identifier based on the channel are specifically: information indicating whether the terminal device supports a predefined uplink and downlink combination identifier based on the frequency band corresponding to an uplink and downlink combination based on the frequency band and a predefined uplink and downlink combination identifier based on the channel corresponding to an uplink and downlink combination based on the channel in which the single transmission/reception changes.

In addition, in this application, an In Device CoexIndication (IDC) message may also be used to report change information of the single transmission/reception capability to the network service node to indicate that the interference of the terminal device has changed;

In a specific example, when the terminal device is in a dual transmission state of the uplink and downlink combination, and the uplink transmission power has a certain impact on the downlink reception of the terminal device, an IDC message and the like can be transmitted to the network service node to recommend that the network service node use a single transmission status; regardless of whether the IDC message is used or other messages are used to transmit the single transmission/reception capability change information, some or all of the following contents can be carried in the message: information indicating that the terminal device currently recommends the network service node to schedule the terminal device according to the single transmission/reception mode (this information can be represented by 1 bit); information indicating that the terminal device currently recommends the network service node to schedule the terminal device according to a dual transmission/reception mode (this information can be represented by 1 bit); information indicating a reason why the terminal device recommends to schedule according to the dual transmission/reception mode; information indicating a reason why the terminal device recommends to schedule according to the single transmission/reception mode; information of a frequency band affected by interference; information of a channel affected by interference; a discontinuous transmission/reception pattern recommended by the terminal device; information of an uplink and downlink configuration recommended by the terminal device; auxiliary information of the discontinuous transmission/reception pattern (e.g., a discontinuous transmission/reception pattern templates, etc.); a current discontinuous transmission/reception pattern of the terminal device; and current uplink carrier transmission power of the terminal device.

In another specific example, when a terminal device is in a single transmission state of the uplink and downlink combination, and the impact of the uplink transmission power on the downlink reception of the terminal device is reduced or disappeared, an IDC message and the like may be transmitted to a network service node to recommend that the network service node use a dual transmission status; regardless of whether the IDC message is used or other messages are used to transmit the single transmission/reception capability change information, some or all of the following contents can be carried in the message: the terminal device currently recommends to use dual transmission status information (this information can be represented by 1 bit), the reason/type value of the dual-transmission status currently recommended by the terminal device (such as interference reduction or disappearance in the frequency band where the interference occurs), and frequency band combination/channel combination where the interference disappears, etc.

Figure 12:
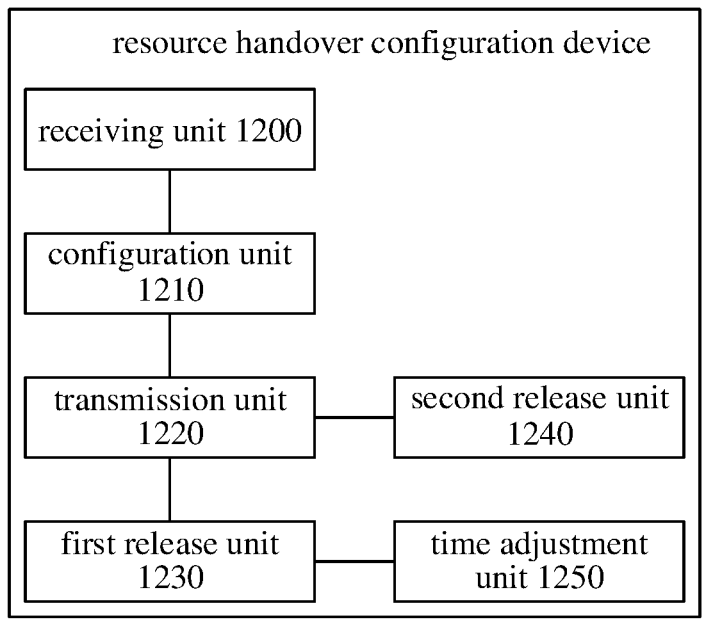
FIG. 12 is a schematic diagram of an embodiment of a device of the present application.

FIG. 12 is a schematic structural diagram of an embodiment of a device of the present application. As shown in FIG. 12, the device in this embodiment mainly includes a receiving unit 1200, a configuration unit 1210, and a communication unit 1220. Optionally, the device in this embodiment may further include one or more of a first release unit 1230, a second release unit 1240, and a time adjustment unit 1250.

The receiving unit 1200 may be used for receiving single transmission/reception capability information from a terminal device.

The configuration unit 1210 may be used for configuring a discontinuous transmission/reception pattern for the terminal device and its corresponding multiple network service nodes according to the single transmission/reception capability information.

The communication unit 1220 may be used for performing single-transmission/reception-mode-based information transmission between the network service node and the terminal device according to the discontinuous transmission/reception pattern.

The first release unit 1230 may be used for instructing the terminal device and the secondary node to release the discontinuous transmission/reception pattern via the main node and release the discontinuous transmission/reception pattern in the main node in the case of learning via the main node in the dual connection that a service provided by the secondary node to the terminal device is completed.

The first release unit 1230 may also be used for instructing the terminal device to release the discontinuous transmission/reception pattern via the main node and release the discontinuous transmission/reception pattern in the main node and the secondary node in the case that the main node and the secondary node receive a request to release the discontinuous transmission/reception pattern from the terminal device.

The second release unit 1240 may be used for instructing the terminal device to release the discontinuous transmission/reception pattern via the first RAT node or the second RAT node and release the discontinuous transmission/reception pattern in the first RAT node and the second RAT node in the case of learning via the first RAT node with the coordination capability that a service provided by the second RAT node to the terminal device is completed.

The second release unit 1240 may also be used for instructing the terminal device to release the discontinuous transmission/reception pattern and the gap via the first RAT node or the second RAT node and release the discontinuous transmission/reception pattern and the gap in the first RAT node and the second RAT node in the case of learning via the first RAT node with the coordination capability that the service provided by the second RAT node to the terminal device is completed.

The second release unit 1240 may also be used for instructing the terminal device to release the discontinuous transmission/reception pattern via the first RAT node or the second RAT node and release the discontinuous transmission/reception pattern in the first RAT node and the second RAT node in the case of learning via the second RAT node with the coordination capability that a service provided by the first RAT node to the terminal device is completed.

The second release unit 1240 may also be used for instructing the terminal device to release the discontinuous transmission/reception pattern and the gap via the first RAT node or the second RAT node and release the discontinuous transmission/reception pattern and the gap in the first RAT node and the second RAT node in the case of learning via the second RAT node with the coordination capability that the service provided by the first RAT node to the terminal device is completed.

The second release unit 1240 may also be used for instructing the terminal device to release the discontinuous transmission/reception pattern via the first RAT node and release the discontinuous transmission/reception pattern in the first RAT node and the second RAT node in the case of receiving from the terminal device a request to release the discontinuous transmission/reception pattern via the first RAT node without the coordination capability.

The second release unit 1240 may also be used for instructing the terminal device to release the discontinuous transmission/reception pattern and the gap via the first RAT node and release the discontinuous transmission/reception pattern and the gap in the first RAT node and the second RAT node in the case of receiving from the terminal device the request to release the discontinuous transmission/reception pattern via the first RAT node without the coordination capability.

The second release unit 1240 may also be used to instruct the terminal device to release the discontinuous transmission/reception pattern via the second RAT node and release the discontinuous transmission/reception pattern in the first RAT node and the second RAT node in the case of receiving from the terminal device the request to release the discontinuous transmission/reception pattern via the second RAT node without the coordination capability.

The second release unit 1240 may also be used for instructing the terminal device to release the discontinuous transmission/reception pattern and the gap via the second RAT node and release the discontinuous transmission/reception pattern and the gap in the first RAT node and the second RAT node in the case of receiving from the terminal device the request to release the discontinuous transmission/reception pattern via the second RAT node without the coordination capability.

The time adjustment unit 1250 may be used for adjusting time of a corresponding network service node according to time information of at least one of the plurality of network service nodes reported by the terminal device in the case that the terminal device is in a time-division single transmission/reception state and the plurality of network service nodes are in an asynchronous state.

Specific operations performed by the receiving unit 1200, the configuration unit 1210, the communication unit 1220, the first release unit 1230, the second release unit 1240, and the time adjustment unit 1250 may refer to the description in the above method embodiment, which will not be described in detail herein.

Figure 13:
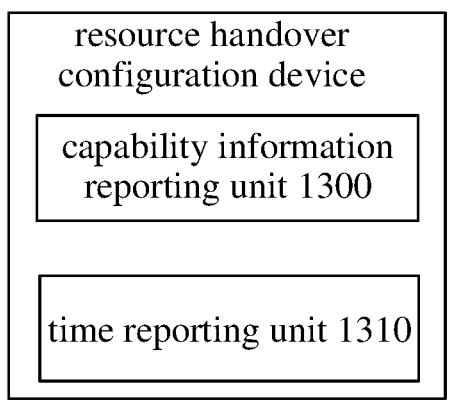
FIG. 13 is a schematic diagram of another embodiment of the device of the present application.

FIG. 13 is a schematic structural diagram of another embodiment of a device of the present application. As shown in FIG. 13, the device in this embodiment mainly includes a capability information reporting unit 1300. Optionally, the device in this embodiment may further include a time reporting unit 1310.

The capability information reporting unit 1300 may be used for reporting, via the terminal device, the single transmission/reception capability information to at least one network service node connected to the terminal device. The single transmission/reception capability information is used for configuring a discontinuous transmission/reception pattern for the terminal device and at least one network service node corresponding to the terminal device, and the discontinuous transmission/reception pattern is used for performing single-transmission/reception-mode-based information transmission between the network service node and the terminal device.

The time reporting unit 1310 may be used for reporting time information of another network service node to the at least one network service node via the terminal device in the case that the terminal device is in a time-division single transmission/reception state and the plurality of network service nodes are in an asynchronous state.

Specific operations performed by the capability information reporting unit 1300 and the time reporting unit 1310 may refer to the description in the above method embodiment, which will not be described in detail herein.

Exemplary Device

Figure 14:
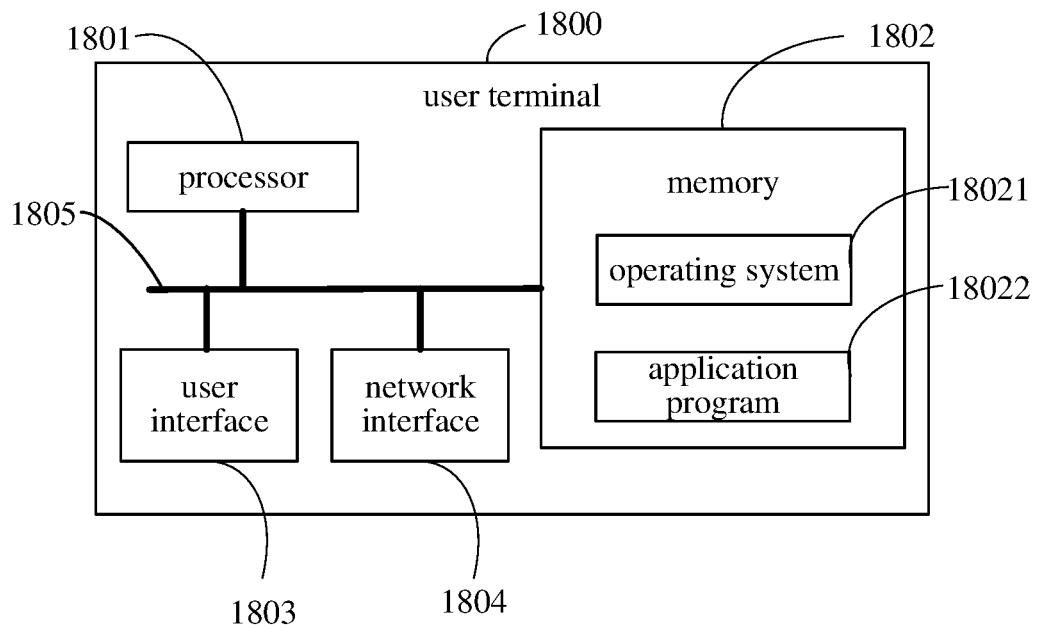
FIG. 14 is a block diagram of an exemplary UE for implementing an embodiment of the present application.

Referring to FIG. 14, FIG. 14 is a structural diagram of another UE (which may also be referred to as a user terminal or a terminal device) according to an embodiment of the present invention. As shown in FIG. 14, the UE 1800 mainly includes: at least one processor 1801, a memory 1802, at least one network interface 1804, and a user interface 1803. Various components in the UE 1800 are coupled together by a bus system 1805. It should be appreciated that the bus system 1805 is used to implement connection communication between these components. In addition to the data bus, the bus system 1805 further includes a power bus, a control bus, and a status signal bus. However, for clarity of description, various buses are all labeled as the bus system 1805 in FIG. 14.

The user interface 1803 may include a display, a keyboard, or a pointing device (for example, a mouse, a track ball, a touch pad, or a touch screen, etc.).

It should be appreciated that the memory 1802 in this embodiment of the present invention may be a volatile memory or a non-volatile memory, or may include both the volatile memory and the non-volatile memory. The non-volatile memory may be a ROM, a Programmable Read Only Memory (PROM), an Erasable Programmable Read Only Memory (EPROM), an Electrically Erasable Programmable Read Only Memory (EEPROM) or flash memory. The volatile memory may be a Random Access Memory (RAM) that acts as an external cache. By way of example and not limitation, many forms of RAMs may be used, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchlink Dynamic Random Access Memory (SLDRAM) and a Direct Rambus Random Access Memory (DRRAM). The memory 1820 of the systems and methods described herein is intended to include, without being limited to, these and any other suitable types of memories.

In some implementations, the memory 1802 stores the following elements, executable modules or data structures, or a subset thereof, or an extended set thereof: an operating system 18021 and an application program 18022.

The operating system 18021 includes various system programs, such as a framework layer, a core library layer, and a driver layer, for implementing various basic services and processing hardware-based tasks. The application program 18022 includes various application programs, such as a Media Player and a Browser, for implementing various application services. A program implementing the method of the embodiments of the present invention may be included in an application program 18022.

In the embodiments of the present invention, the UE 1800 further includes a computer program stored on the memory 1802 and executable on the processor 1801, specifically, it may be a computer program stored in the application program 18022, and the computer program is used for being executed by the processor 1801 to implement the following steps: reporting, via a terminal device, single transmission/reception capability information to at least one network service node connected to the terminal device, wherein the single transmission/reception capability information is used for configuring a discontinuous transmission/reception pattern for the terminal device and the at least one network service node corresponding to the terminal device, and the discontinuous transmission/reception pattern is used for performing single-transmission/reception-mode-based information transmission between the network service node and the terminal device.

The method disclosed in the above embodiments of the present invention may be applied to the processor 1801, or implemented by the processor 1801. The processor 1801 may be an integrated circuit chip with signal processing capabilities. In an implementation process, each step of the above method may be completed by an integrated logic circuit of hardware in the processor 1801 or an instruction in a form of software. The processor 1801 may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components. Various methods, steps, and logical block diagrams disclosed in the embodiments of the present invention may be implemented or executed. The general-purpose processor may be a microprocessor or the processor may be any conventional processor or the like. The steps of the method disclosed in combination with the embodiments of the present invention may be directly embodied as being executed by a hardware decoding processor, or being executed by using a combination of hardware and software modules in a decoding processor. The software module may be located in a well-established storage medium in the art, such as a random access memory, a flash memory, a read-only memory, a programmable read-only memory, or an electrically erasable programmable memory, a register, and the like. The storage medium is located in the memory 1802, and the processor 1801 reads information in the memory 1802 and completes the steps of the above method in combination with its hardware.

It should be appreciated that the embodiments described herein may be implemented by hardware, software, firmware, middleware, microcode, or a combination thereof. For hardware implementation, the processing unit can be implemented in one or more ASICs, DSPs, Digital Signal Processing Devices (DSPDs), Programmable Logic Devices (PLDs), FPGAs, general-purpose processors, controllers, microcontrollers, microprocessors, and other electronic units for performing functions of this application or a combination thereof.

For software implementation, techniques described herein may be implemented by modules (such as procedures, functions) that perform the functions described herein. Software codes may be stored in a memory and executed by a processor. The memory can be implemented in the processor or external to the processor.

Figure 15:
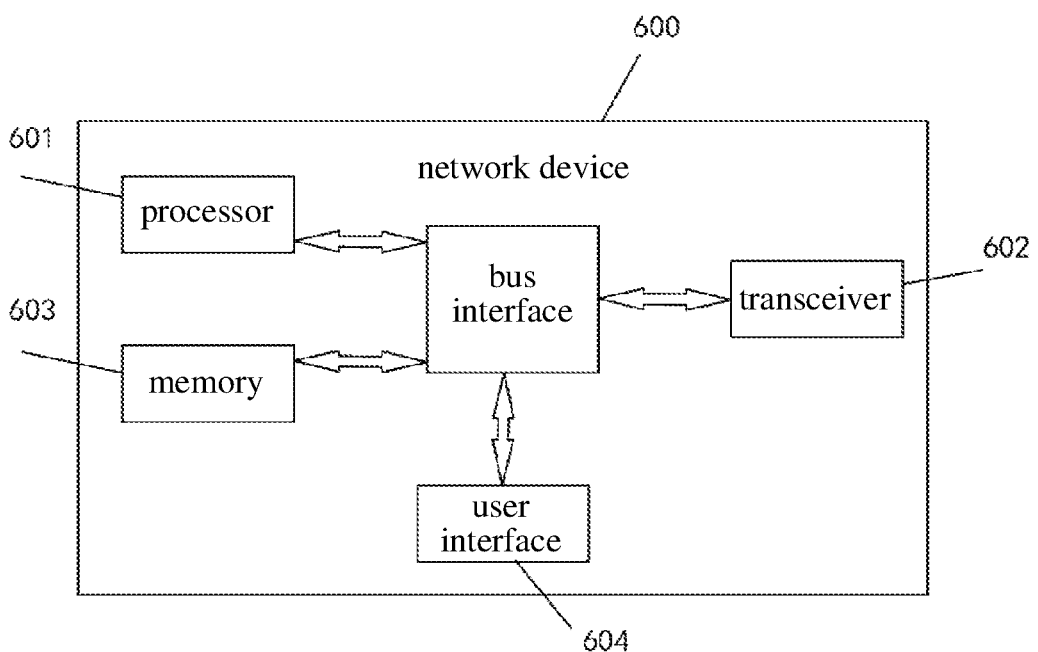
FIG. 15 is a block diagram of an exemplary network device for implementing an embodiment of the present application.

Referring to FIG. 15, FIG. 15 is a structural diagram of a network device according to an embodiment of the present invention. The network device may be a device for communicating with a mobile device, and the network device may be a Global System of Mobile communication (GSM) or a Base Transceiver Station (BTS) in Code Division Multiple Access (CDMA) system, or NodeB (NB) in Wideband Code Division Multiple Access (WCDMA) system, or evolution Node B (eNB or eNodeB) in Long Term Evolution (LTE) system or access point, or a vehicle-mounted device, a wearable device, a network side device in future 5G network, or a network device in future evolved Public Land Mobile Network (PLMN).

As shown in FIG. 15, a network device 600 includes a processor 601, a transceiver 602, a memory 603, a user interface 604, and a bus interface. In FIG. 15, bus architecture may include any number of interconnected buses and bridges, and various circuits such as one or more processors specifically represented by the processor 601 and the memory represented by the memory 603 are linked together. The bus architecture can also link various other circuits together, such as peripheral devices, voltage regulators, and power management circuits, which are well known in the art, so they are not further described herein. The bus interface provides an interface. The transceiver 602 may include a plurality of elements, including a transmitter and a receiver, providing units for communicating with various other devices over a transmission medium. For different UEs, the user interface 604 may also be an interface capable of externally connecting and internally connecting required devices. The connected devices include, but are not limited to, a keypad, a display, a speaker, a microphone, a joystick, and the like. The processor 601 is responsible for managing the bus architecture and general processing, and the memory 603 may store data used by the processor 601 when performing operations.

In the embodiments of the present invention, the network device 600 further includes: a computer program stored on the memory 603 and executable on the processor 601, the computer program is used for being executed by the processor 601 to implement the following steps: receiving the single transmission/reception capability information from the terminal device; configuring the discontinuous transmission/reception pattern for the terminal device and the plurality of network service nodes corresponding to the terminal device according to the single transmission/reception capability information; and performing the single-transmission/reception-mode-based information transmission between the network service node and the terminal device according to the discontinuous transmission/reception pattern. The following steps may also be implemented: reporting, via a terminal device, single transmission/reception capability information to at least one network service node connected to the terminal device; wherein the single transmission/reception capability information is used for configuring the discontinuous transmission/reception pattern for the terminal device, and the discontinuous transmission/reception pattern is used for performing single-transmission/reception-mode-based information transmission between the network service node and the terminal device.

An embodiment of the present invention further provides a UE (also referred to as a user terminal or a terminal device, etc.), including: a memory, a processor, and a computer program stored on the memory and executable on the processor, the computer program is used for being executed by the processor to implement the steps in the resource handover configuration method provided by the embodiments of the present invention.

An embodiment of the present invention also provides a computer readable storage medium, wherein the computer readable storage medium stores a computer program, and the computer program is used for being executed by the processor 601 to implement the steps in the resource handover configuration method provided by the embodiments of the present invention.

An embodiment of the present invention further provides a computer program, the computer program is used for being executed by the processor 601 to implement the steps in the resource handover configuration method provided by the embodiments of the present invention.

A person skilled in the art may realize that the units and algorithm steps of each example described in combination with the embodiments disclosed herein may be implemented in electronic hardware, or a combination of computer software and electronic hardware. Whether these functions are performed in hardware or software depends on a specific application and design constraints of the technical solution. A professional technician may implement the described functions in varying ways for each specific application, but such implementation should not be considered beyond the scope of the present invention.

A person skilled in the art may clearly understand that, for the convenience and brevity of description, the specific operating processes of the systems, devices, and units described above may refer to the corresponding processes in the above method embodiments, which will not be repeated herein.

In the embodiments provided by the present application, it should be appreciated that the disclosed device and method may be implemented in other manners. For example, the device embodiments described above are merely illustrative. For example, division of the units is merely a logical function division. In actual implementation, there may be another division manner. For example, multiple units or components may be combined, or may be integrated into another system, or some features may be ignored or not executed. In addition, coupling or direct coupling or communication connection between the components shown or discussed may be indirect coupling or a communication connection through some interfaces, devices or units, and may be electrical, mechanical or other forms.

The units described as separate components may or may not be physically separated, and the components displayed as the units may or may not be physical units, that is, they may be located in one place or distributed to multiple network units. Some or all of the units may be selected according to actual needs to achieve objectives of the embodiments of the present invention.

In addition, different functional units in the different embodiments of the present invention may be integrated into one processing unit, or may physically exist separately, or two or more units may be integrated into one unit.

When the functions are implemented in a form of software functional units and sold or used as independent products, they may be stored in a computer-readable storage medium. Based on this understanding, the technical solution of the present invention essentially, or a part that contributes to the prior art, or a part of the technical solution may be embodied in a form of a software product. The computer software product is stored in a storage medium and includes instructions for causing a computer device (for example, a personal computer, a server, or a network device) to perform all or part of the steps of the method described in various embodiments of the present invention. The above storage medium includes various media that can store program codes, such as a Universal Serial Bus (USB) flash disk, a mobile hard disk, a ROM, a RAM, a magnetic disk, or an optical disk, and the like.

The above content is only the specific embodiments of the present invention, but the scope of the present invention is not limited thereto. Any changes or substitutions easily conceived by a person skilled in the art in the technical scope of the invention should fall within the protection scope of the invention. Therefore, the protection scope of the present invention should be determined by the scope of the appended claims.

What is claimed is:

1. A resource handover configuration method, wherein the resource handover configuration method is applied to a network device and comprises:
   receiving single transmission or reception capability information from a terminal device;
   configuring a discontinuous transmission or reception pattern for the terminal device and a plurality of network service nodes corresponding to the terminal device according to the single transmission or reception capability information; and
   performing single-transmission or reception-mode-based information transmission between the network service node and the terminal device according to the discontinuous transmission or reception pattern,
   wherein the single transmission or reception capability information comprises at least one of:
   information indicating whether radio frequency retuning is needed when an uplink and downlink combination formed by a frequency band is used by the terminal device for single transmission or reception, and time required for the radio frequency retuning in the case that the radio frequency retuning is needed;
   information indicating whether the radio frequency retuning is needed when an uplink and downlink combination formed by the frequency band and a channel is used by the terminal device for the single transmission or reception, and time required for the radio frequency retuning in the case that the radio frequency retuning is needed;
   information indicating isolation degree of an interference source to an interfered object when the uplink and downlink combination formed by the frequency band is used by the terminal device for the single transmission or reception;
   information indicating isolation degree of the interference source to the interfered object when the uplink and downlink combination formed by the frequency band and the channel is used by the terminal device for the single transmission or reception;
   information indicating an order of intermodulation interference of the interference source to the interfered object when the uplink and downlink combination formed by the frequency band is used by the terminal device for the single transmission or reception;
   information indicating an order of the intermodulation interference of the interference source to the interfered object when the uplink and downlink combination formed by the frequency band and the channel is used by the terminal device for the single transmission or reception;
   information indicating whether the single transmission or reception is supported by the terminal device when the uplink and downlink combination formed by the frequency band is used by the terminal device for the single transmission or reception; or
   information indicating whether the single transmission or reception is supported by the terminal device when the uplink and downlink combination formed by the frequency band and the channel is used by the terminal device for the single transmission or reception,
   wherein the single transmission or reception capability information is reported in a form of a correspondence between predefined uplink and downlink combination identifiers and single transmission or reception capability information groups, and the predefined uplink and downlink combination identifiers are based on a frequency band and a channel; wherein each of the predefined uplink and downlink combination identifiers based on the frequency band and the channel corresponds to at least one predefined uplink and downlink combination based on the frequency band and the channel, and each of the terminal device and the network service node maintains a correspondence between the predefined uplink and downlink combination identifiers based on the frequency band and the channel and predefined uplink and downlink combinations based on the frequency band and the channel, the single transmission or reception capability information group corresponding to the predefined uplink and downlink combination identifier based on the frequency band and the channel is: single transmission or reception capability information corresponding to the predefined uplink and downlink combination based on the frequency band and the channel corresponding to the predefined uplink and downlink combination identifier based on the frequency band and the channel; or
   the single transmission or reception capability information is reported in a form of predefined uplink and downlink combination identifiers based on a frequency band and a correspondence between predefined uplink and downlink combination identifiers based on a channel and single transmission or reception capability information groups, wherein each of the predefined uplink and downlink combination identifiers based on the frequency band corresponds to at least one predefined uplink and downlink combination based on the frequency band, and each of the predefined uplink and downlink combination identifiers based on the channel corresponds to at least one predefined uplink and downlink combination based on the channel, and each of the terminal device and the network service node maintains a correspondence between the predefined uplink and downlink combination identifiers based on the frequency band and the predefined uplink and downlink combinations based on the frequency band, and a correspondence between the predefined uplink and downlink combination identifiers based on the channel and the predefined uplink and downlink combinations based on the channel, the single transmission or reception capability information group corresponding to the predefined uplink and downlink combination identifiers based on the frequency band and the predefined uplink and downlink combination identifiers based on the channel is: single transmission or reception capability information corresponding to a predefined uplink and downlink combination based on the frequency band and the channel, and the predefined uplink and downlink combination based on the frequency band and the channel is formed by combining the uplink and downlink combination corresponding to the predefined uplink and downlink combination identifier based on the frequency band and the uplink and downlink combination corresponding to the predefined uplink and downlink combination identifier based on the channel; or
   the single transmission or reception capability information is reported in a form of a bitmap formed by single transmission or reception capability information groups, wherein a position of each of the single transmission or reception capability information groups in the bitmap corresponds to at least one uplink and downlink combination, and each of the terminal device and the network service node maintains a correspondence between the position in the bitmap and the at least one uplink and downlink combination, and each of the single transmission or reception capability information groups is the single transmission or reception capability information corresponding to the respective at least one uplink and downlink combination.

2. The resource handover configuration method according to claim 1, wherein the step of receiving the single transmission or reception capability information from the terminal device comprise:
   receiving single transmission or reception capability information initially reported by the terminal device; or
   receiving single transmission or reception capability information reported by the terminal device at regular or irregular time,
   wherein the single transmission or reception capability information reported at the regular or irregular time is used for updating single transmission or reception capability information stored in the network service node.

3. The resource handover configuration method according to claim 1, wherein the single transmission or reception capability information comprises:
   single transmission or reception capability information based on all uplink and downlink combinations formed by all frequency bands supported by the terminal device; or
   single transmission or reception capability information based on all uplink and downlink combinations formed by all frequency bands and channels supported by the terminal device; or
   single transmission or reception capability information of an uplink and downlink combination supporting single transmission or reception in all uplink and downlink combinations formed by all frequency bands supported by the terminal device; or
   single transmission or reception capability information of an uplink and downlink combination supporting the single transmission or reception in all uplink and downlink combinations formed by all frequency bands and channels supported by the terminal device.

4. The resource handover configuration method according to claim 1, wherein the step of receiving the single transmission or reception capability information from the terminal device further comprise:
   receiving single transmission or reception capability information reported by the terminal device based on a reporting indication of the network service node; or
   receiving single transmission or reception capability information and corresponding power information reported by the terminal device based on the reporting indication of the network service node.

5. The resource handover configuration method according to claim 4, wherein the reported single transmission or reception capability information comprises:
   single transmission or reception capability information of a combination of an uplink and downlink frequency band specified by the network service node; or
   single transmission or reception capability information of the combination of the uplink and downlink frequency band specified by the network service node at a specified power; or
   single transmission or reception capability information of a combination of the uplink and downlink frequency band and a channel specified by the network service node; or
   single transmission or reception capability information of the combination of the uplink and downlink frequency band and the channel specified by the network service node at a specified power.

6. The resource handover configuration method according to claim 1, wherein
   the information indicating whether the single transmission or reception is supported by the terminal device indicates that the single transmission or reception is supported by the terminal device; or
   the information indicating whether the single transmission or reception is supported by the terminal device indicates that dual transmission or reception is optional; or
   the information indicating whether the single transmission or reception is supported by the terminal device indicates that the dual transmission or reception is supported by the terminal device.

7. The resource handover configuration method according to claim 6, wherein the single transmission or reception being supported by the terminal device indicates at least one of:
   the terminal device recommends the network service node to schedule the terminal device according to the single transmission or reception mode;
   when the terminal device is scheduled by the network service node according to a dual transmission or reception mode, downlink performance of the terminal device is lower than expected performance;
   whether simultaneous dual transmission or reception transmission is supported by the terminal device in a predefined frequency band;
   whether the simultaneous dual transmission or reception transmission is supported by the terminal device in the predefined frequency band and a predefined channel;
   only the single transmission or reception mode is supported by the terminal device; or
   the single transmission or reception mode is supported by the terminal device.

8. The resource handover configuration method according to claim 1, wherein the plurality of network service nodes corresponding to the terminal device comprise:
   a main node and a secondary node based on dual connection; or
   two Radio Access Technology (RAT) nodes based on dual attachment; or
   a source node and a target node in a process of handover between the network service nodes.

9. The resource handover configuration method according to claim 8, wherein the step of performing the single-transmission or reception-mode-based information transmission between the network service node and the terminal device according to the discontinuous transmission or reception pattern comprises:
   setting a secondary node for the terminal device via a main node that establishes a connection with the terminal device, and initiating a process of coordinating the discontinuous transmission or reception pattern with the secondary node via the main node according to the single transmission or reception capability information from the terminal device; and providing the coordinated discontinuous transmission or reception pattern to the terminal device via the main node or the secondary node; or setting the secondary node for the terminal device via the main node that establishes the connection with the terminal device, and initiating a process of coordinating the discontinuous transmission or reception pattern with the main node via the secondary node according to the single transmission or reception capability information from the terminal device; and providing the coordinated discontinuous transmission or reception pattern to the terminal device via the main node or the secondary node; or setting the secondary node for the terminal device via the main node that establishes the connection with the terminal device, and initiating a process of coordinating the discontinuous transmission or reception pattern with the secondary node via the main node according to the single transmission or reception capability information from the terminal device; and providing the coordinated discontinuous transmission or reception pattern and a gap for suspending an on-going service to the terminal device via the main node or the secondary node; or providing the secondary node for the terminal device via the main node that establishes the connection with the terminal device, and initiating a process of coordinating the discontinuous transmission or reception pattern with the main node via the secondary node according to the single transmission or reception capability information from the terminal device; and providing the coordinated discontinuous transmission or reception pattern and the gap for suspending the on-going service to the terminal device via the main node or the secondary node; or setting a secondary node for the terminal device via a main node that establishes a connection with the terminal device, and initiating a process of coordinating the discontinuous transmission or reception pattern with the secondary node via the main node according to the single transmission or reception capability information from the terminal device; and scheduling the terminal device via the main node and the secondary node respectively based on the coordinated discontinuous transmission or reception pattern; or setting the secondary node for the terminal device via the main node that establishes the connection with the terminal device, and initiating a process of coordinating the discontinuous transmission or reception pattern with the main node via the secondary node according to the single transmission or reception capability information from the terminal device; and scheduling the terminal device via the main node and the secondary node respectively based on the coordinated discontinuous transmission or reception pattern and a gap for suspending an on-going service; or setting the secondary node for the terminal device via the main node that establishes the connection with the terminal device, and initiating a process of coordinating the discontinuous transmission or reception pattern with the main node via the secondary node according to the single transmission or reception capability information from the terminal device; and scheduling the terminal device via the main node and the secondary node respectively based on the coordinated discontinuous transmission or reception pattern and the gap for suspending the on-going service; or setting a secondary node for the terminal device via a main node establishing a connection with the terminal device, and coordinating the discontinuous transmission or reception pattern via the main node and the secondary node respectively according to the single transmission or reception capability information from the terminal device; and providing the coordinated discontinuous transmission or reception pattern to the terminal device via the main node or the secondary node; or setting the secondary node for the terminal device via the main node establishing the connection with the terminal device, and coordinating the discontinuous transmission or reception pattern via the main node and the secondary node respectively according to the single transmission or reception capability information from the terminal device; and providing the coordinated discontinuous transmission or reception pattern and a gap for suspending an on-going service to the terminal device via the main node or the secondary node; or setting a secondary node for the terminal device via a main node establishing a connection with the terminal device, and coordinating the discontinuous transmission or reception pattern via the main node and the secondary node respectively according to the single transmission or reception capability information from the terminal device; and scheduling the terminal device via the main node and the secondary node respectively based on the coordinated discontinuous transmission or reception pattern; or setting the secondary node for the terminal device via the main node establishing the connection with the terminal device, and coordinating the discontinuous transmission or reception pattern via the main node and the secondary node respectively according to the single transmission or reception capability information from the terminal device; and scheduling the terminal device via the main node and the secondary node respectively based on the coordinated discontinuous transmission or reception pattern and a gap for suspending an on-going service.

10. The resource handover configuration method according to claim 9, wherein the method further comprises:
in the case of learning via the main node that a service provided by the secondary node to the terminal device is completed, instructing the terminal device and the secondary node to release the discontinuous transmission or reception pattern via the main node, and releasing the discontinuous transmission or reception pattern in the main node; or
in the case of learning via the main node that the service provided by the secondary node to the terminal device is completed, instructing the terminal device and the secondary node to release the discontinuous transmission or reception pattern and the gap via the main node, and releasing the discontinuous transmission or reception pattern and the gap in the main node; or
in the case that the main node and the secondary node receive a request to release the discontinuous transmission or reception pattern from the terminal device, instructing the terminal device to release the discontinuous transmission or reception pattern via the main node, and releasing the discontinuous transmission or reception pattern in the main node and the secondary node; or in the case that the main node and the secondary node receive a request to release at least one of the discontinuous transmission or reception pattern or the gap from the terminal device, instructing the terminal device to release the discontinuous transmission or reception pattern and the gap via the main node, and releasing the discontinuous transmission or reception pattern and the gap in the main node and the secondary node.

11. The resource handover configuration method according to claim 8, wherein the step of performing the single-transmission or reception-mode-based information transmission between the network service node and the terminal device according to the discontinuous transmission or reception pattern comprises:

in the case that a first RAT node attached to the terminal device receives a discontinuous transmission or reception pattern configuration request of the terminal device, based on the single transmission or reception capability information, coordinating the discontinuous transmission or reception pattern or coordinating the discontinuous transmission or reception pattern and a gap used for suspending an on-going service via the first RAT node and a second RAT node with coordination capability, and providing the coordinated discontinuous transmission or reception pattern or both the coordinated discontinuous transmission or reception pattern and the gap to the terminal device via the first RAT node or the second RAT node; or in the case that the first RAT node attached to the terminal device receives a discontinuous transmission or reception pattern configuration request of the terminal device, based on the single transmission or reception capability information, coordinating the discontinuous transmission or reception pattern or coordinating the discontinuous transmission or reception pattern and a gap via the first RAT node and a second RAT node with coordination capability, and scheduling the terminal device via the first RAT node or the second RAT node based on the discontinuous transmission or reception pattern or based on the discontinuous transmission or reception pattern and the gap, respectively; or in the case that the first RAT node attached to the terminal device receives a discontinuous transmission or reception pattern configuration request of the terminal device, based on the single transmission or reception capability information, configuring the discontinuous transmission or reception pattern for the terminal device via the first RAT node or configuring the discontinuous transmission or reception pattern and providing the configured discontinuous transmission or reception pattern to the terminal device, providing the discontinuous transmission or reception pattern or both the discontinuous transmission or reception pattern and the gap to the second RAT node via the terminal device, and transmitting to the terminal device via second RAT node information indicating whether the discontinuous transmission or reception pattern is accepted or whether the discontinuous transmission or reception pattern and the gap are accepted.

12. The resource handover configuration method according to claim 11, wherein the method further comprises:

in the case of learning via the first RAT node with the coordination capability that a service provided by the second RAT node to the terminal device is completed, instructing the terminal device to release the discontinuous transmission or reception pattern via the first RAT node or the second RAT node, and releasing the discontinuous transmission or reception pattern in the first RAT node and the second RAT node; or in the case of learning via the first RAT node with the coordination capability that the service provided by the second RAT node to the terminal device is completed, instructing the terminal device to release the discontinuous transmission or reception pattern and the gap via the first RAT node or the second RAT node, and releasing the discontinuous transmission or reception pattern and the gap in the first RAT node and the second RAT node; or in the case of learning via the second RAT node with the coordination capability that a service provided by the first RAT node to the terminal device is completed, instructing the terminal device to release the discontinuous transmission or reception pattern via the first RAT node or the second RAT node, and releasing the discontinuous transmission or reception pattern in the first RAT node and the second RAT node; or in the case of learning via the second RAT node with the coordination capability that the service provided by the first RAT node to the terminal device is completed, instructing the terminal device to release the discontinuous transmission or reception pattern and the gap via the first RAT node or the second RAT node, and releasing the discontinuous transmission or reception pattern and the gap in the first RAT node and the second RAT node; or in the case of receiving from the terminal device a request to release the discontinuous transmission or reception pattern via the first RAT node without the coordination capability, instructing the terminal device to release the discontinuous transmission or reception pattern via the first RAT node, and releasing the discontinuous transmission or reception pattern in the first RAT node and the second RAT node; or in the case of receiving from the terminal device the request to release the discontinuous transmission or reception pattern via the first RAT node without the coordination capability, instructing the terminal device to release the discontinuous transmission or reception pattern and the gap via the first RAT node, and releasing the discontinuous transmission or reception pattern and the gap in the first RAT node and the second RAT node; or in the case of receiving from the terminal device the request to release the discontinuous transmission or reception pattern via the second RAT node without the coordination capability, instructing the terminal device to release the discontinuous transmission or reception pattern via the second RAT node, and releasing the discontinuous transmission or reception pattern in the first RAT node and the second RAT node; or in the case of receiving from the terminal device the request to release the discontinuous transmission or reception pattern via the second RAT node without the coordination capability, instructing the terminal device to release the discontinuous transmission or reception pattern and the gap via the second RAT node, and releasing the discontinuous transmission or reception pattern and the gap in the first RAT node and the second RAT node.

13. The resource handover configuration method according to claim 8, wherein the step of performing the single-transmission or reception-mode-based information transmission between the network service node and the terminal device according to the discontinuous transmission or reception pattern comprises:

in the case of receiving, from a handover source node, a discontinuous transmission or reception pattern and the single transmission or reception capability information of the terminal device via the target node, determining whether to maintain the discontinuous transmission or reception pattern according to the discontinuous transmission or reception pattern and the single transmission or reception capability information of the terminal device; in the case of determining to maintain the discontinuous transmission or reception pattern, notifying the terminal device via the target node, otherwise, configuring a new discontinuous transmission or reception pattern or configuring change amount of the discontinuous transmission or reception pattern, and providing the new discontinuous transmission or reception pattern or the change amount to the source node via the target node, to provide the new discontinuous transmission or reception pattern or the change amount to the terminal device via the source node; or in the case of receiving, from the handover source node, a discontinuous transmission or reception pattern, a gap and the single transmission or reception capability information of the terminal device via the target node, determining whether to maintain the discontinuous transmission or reception pattern according to the discontinuous transmission or reception pattern, the gap and the single transmission or reception capability information of the terminal device; in the case of determining to maintain the discontinuous transmission or reception pattern and the gap, notifying the terminal device via the target node, otherwise, configuring the new discontinuous transmission or reception pattern or configuring the change amount of the discontinuous transmission or reception pattern, and providing the new discontinuous transmission or reception pattern or the change amount to the source node via the target node, to provide the new discontinuous transmission or reception pattern or the change amount to the terminal device via the source node.

14. The resource handover configuration method according to claim 1, wherein the method further comprises:

in the case that the terminal device is in a time-division single transmission or reception state and the plurality of network service nodes are in an asynchronous state, adjusting time of a corresponding network service node according to time information of at least one of the plurality of network service nodes reported by the terminal device.

15. A resource handover configuration method, comprising:

reporting, via a terminal device, single transmission or reception capability information to at least one network service node connected to the terminal device, wherein the single transmission or reception capability information is used for configuring a discontinuous transmission or reception pattern for the terminal device and the at least one network service node corresponding to the terminal device, and the discontinuous transmission or reception pattern is used for performing single-transmission or reception-mode-based information transmission between the network service node and the terminal device, wherein the single transmission or reception capability information comprises at least one of:

information indicating whether radio frequency retuning is needed when an uplink and downlink combination formed by a frequency band is used by the terminal device for single transmission or reception, and time required for the radio frequency retuning in the case that the radio frequency retuning is needed;

information indicating whether the radio frequency retuning is needed when an uplink and downlink combination formed by the frequency band and a channel is used by the terminal device for the single transmission or reception, and time required for the radio frequency retuning in the case that the radio frequency retuning is needed;

information indicating isolation degree of an interference source to an interfered object when the uplink and downlink combination formed by the frequency band is used by the terminal device for the single transmission or reception;

information indicating isolation degree of the interference source to the interfered object when the uplink and downlink combination formed by the frequency band and the channel is used by the terminal device for the single transmission or reception;

information indicating an order of intermodulation interference of the interference source to the interfered object when the uplink and downlink combination formed by the frequency band is used by the terminal device for the single transmission or reception;

information indicating an order of the intermodulation interference of the interference source to the interfered object when the uplink and downlink combination formed by the frequency band and the channel is used by the terminal device for the single transmission or reception;

information indicating whether the single transmission or reception is supported by the terminal device when the uplink and downlink combination formed by the frequency band is used by the terminal device for the single transmission or reception; or information indicating whether the single transmission or reception is supported by the terminal device when the uplink and downlink combination formed by the frequency band and the channel is used by the terminal device for the single transmission or reception, wherein the single transmission or reception capability information is reported in a form of a correspondence between predefined uplink and downlink combination identifiers and single transmission or reception capability information groups, and the predefined uplink and downlink combination identifiers are based on a frequency band and a channel; wherein each of the predefined uplink and downlink combination identifiers based on the frequency band and the channel corresponds to at least one predefined uplink and downlink combination based on the frequency band and the channel, and each of the terminal device and the network service node maintains a correspondence between the predefined uplink and downlink combination identifiers based on the frequency band and the channel and predefined uplink and downlink combinations based on the frequency band and the channel, the single transmission or reception capability information group corresponding to the predefined uplink and downlink combination identifier based on the frequency band and the channel is: single transmission or reception capability information corresponding to the predefined uplink and downlink combination based on the frequency band and the channel corresponding to the predefined uplink and downlink combination identifier based on the frequency band and the channel; or the single transmission or reception capability information is reported in a form of predefined uplink and downlink combination identifiers based on a frequency band and a correspondence between predefined uplink and downlink combination identifiers based on a channel and single transmission or reception capability information groups, wherein each of the predefined uplink and downlink combination identifiers based on the frequency band corresponds to at least one predefined uplink and downlink combination based on the frequency band, and each of the predefined uplink and downlink combination identifiers based on the channel corresponds to at least one predefined uplink and downlink combination based on the channel, and each of the terminal device and the network service node maintains a correspondence between the predefined uplink and downlink combination identifiers based on the frequency band and the predefined uplink and downlink combinations based on the frequency band, and a correspondence between the predefined uplink and downlink combination identifiers based on the channel and the predefined uplink and downlink combinations based on the channel, the single transmission or reception capability information group corresponding to the predefined uplink and downlink combination identifiers based on the frequency band and the predefined uplink and downlink combination identifiers based on the channel is: single transmission or reception capability information corresponding to a predefined uplink and downlink combination based on the frequency band and the channel, and the predefined uplink and downlink combination based on the frequency band and the channel is formed by combining the uplink and downlink combination corresponding to the predefined uplink and downlink combination identifier based on the frequency band and the uplink and downlink combination corresponding to the predefined uplink and downlink combination identifier based on the channel; or the single transmission or reception capability information is reported in a form of a bitmap formed by single transmission or reception capability information groups, wherein a position of each of the single transmission or reception capability information groups in the bitmap corresponds to at least one uplink and downlink combination, and each of the terminal device and the network service node maintains a correspondence between the position in the bitmap and the at least one uplink and downlink combination, and each of the single transmission or reception capability information groups is the single transmission or reception capability information corresponding to the respective at least one uplink and downlink combination.

16. The resource handover configuration method according to claim 15, wherein the method further comprises:

in the case that the terminal device is in a time-division single transmission or reception state and a plurality of network service nodes are in an asynchronous state, reporting time information of another network service node to the at least one network service node via the terminal device.

17. A User Equipment (UE), comprising: a memory, a processor, and a computer program stored on the memory and executable on the processor, the computer program is used for being executed by the processor to:

report single transmission or reception capability information to at least one network service node connected to the UE, wherein the single transmission or reception capability information is used for configuring a discontinuous transmission or reception pattern for the UE and the at least one network service node corresponding to the UE, and the discontinuous transmission or reception pattern is used for performing single-transmission or reception-mode-based information transmission between the network service node and the UE, wherein the single transmission or reception capability information comprises at least one of:

information indicating whether radio frequency retuning is needed when an uplink and downlink combination formed by a frequency band is used by the UE for single transmission or reception, and time required for the radio frequency retuning in the case that the radio frequency retuning is needed;

information indicating whether the radio frequency retuning is needed when an uplink and downlink combination formed by the frequency band and a channel is used by the UE for the single transmission or reception, and time required for the radio frequency retuning in the case that the radio frequency retuning is needed;

information indicating isolation degree of an interference source to an interfered object when the uplink and downlink combination formed by the frequency band is used by the UE for the single transmission or reception;

information indicating isolation degree of the interference source to the interfered object when the uplink and downlink combination formed by the frequency band and the channel is used by the UE for the single transmission or reception;

information indicating an order of intermodulation interference of the interference source to the interfered object when the uplink and downlink combination formed by the frequency band is used by the UE for the single transmission or reception;

information indicating an order of the intermodulation interference of the interference source to the interfered object when the uplink and downlink combination formed by the frequency band and the channel is used by the UE for the single transmission or reception;

information indicating whether the single transmission or reception is supported by the UE when the uplink and downlink combination formed by the frequency band is used by the UE for the single transmission or reception; or information indicating whether the single transmission or reception is supported by the UE when the uplink and downlink combination formed by the frequency band and the channel is used by the UE for the single transmission or reception, wherein the single transmission or reception capability information is reported in a form of a correspondence between predefined uplink and downlink combination identifiers and single transmission or reception capability information groups, and the predefined uplink and downlink combination identifiers are based on a frequency band and a channel; wherein each of the predefined uplink and downlink combination identifiers based on the frequency band and the channel corresponds to at least one predefined uplink and downlink combination based on the frequency band and the channel, and each of the terminal device and the network service node maintains a correspondence between the predefined uplink and downlink combination identifiers based on the frequency band and the channel and predefined uplink and downlink combinations based on the frequency band and the channel, the single transmission or reception capability information group corresponding to the predefined uplink and downlink combination identifier based on the frequency band and the channel is: single transmission or reception capability information corresponding to the predefined uplink and downlink combination based on the frequency band and the channel corresponding to the predefined uplink and downlink combination identifier based on the frequency band and the channel; or the single transmission or reception capability information is reported in a form of predefined uplink and downlink combination identifiers based on a frequency band and a correspondence between predefined uplink and downlink combination identifiers based on a channel and single transmission or reception capability information groups, wherein each of the predefined uplink and downlink combination identifiers based on the frequency band corresponds to at least one predefined uplink and downlink combination based on the frequency band, and each of the predefined uplink and downlink combination identifiers based on the channel corresponds to at least one predefined uplink and downlink combination based on the channel, and each of the terminal device and the network service node maintains a correspondence between the predefined uplink and downlink combination identifiers based on the frequency band and the predefined uplink and downlink combinations based on the frequency band, and a correspondence between the predefined uplink and downlink combination identifiers based on the channel and the predefined uplink and downlink combinations based on the channel, the single transmission or reception capability information group corresponding to the predefined uplink and downlink combination identifiers based on the frequency band and the predefined uplink and downlink combination identifiers based on the channel is: single transmission or reception capability information corresponding to a predefined uplink and downlink combination based on the frequency band and the channel, and the predefined uplink and downlink combination based on the frequency band and the channel is formed by combining the uplink and downlink combination corresponding to the predefined uplink and downlink combination identifier based on the frequency band and the uplink and downlink combination corresponding to the predefined uplink and downlink combination identifier based on the channel; or the single transmission or reception capability information is reported in a form of a bitmap formed by single transmission or reception capability information groups, wherein a position of each of the single transmission or reception capability information groups in the bitmap corresponds to at least one uplink and downlink combination, and each of the terminal device and the network service node maintains a correspondence between the position in the bitmap and the at least one uplink and downlink combination, and each of the single transmission or reception capability information groups is the single transmission or reception capability information corresponding to the respective at least one uplink and downlink combination.

18. The UE according to claim 17, wherein the computer program is used for being executed by the processor to:
in the case that the UE is in a time-division single transmission or reception state and a plurality of network service nodes are in an asynchronous state, report time information of another network service node to the at least one network service node.

* * * * *